United States Patent
Nishikawa et al.

(10) Patent No.: US 10,479,058 B2
(45) Date of Patent: Nov. 19, 2019

(54) PRESSURE-SENSITIVE ADHESIVE SHEET

(71) Applicant: NITTO DENKO CORPORATION, Ibaraki-shi, Osaka (JP)

(72) Inventors: Kenichi Nishikawa, Ibaraki (JP); Takuma Ogawa, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 15/502,276

(22) PCT Filed: Jul. 14, 2015

(86) PCT No.: PCT/JP2015/070096
§ 371 (c)(1),
(2) Date: Feb. 7, 2017

(87) PCT Pub. No.: WO2016/021373
PCT Pub. Date: Feb. 11, 2016

(65) Prior Publication Data
US 2017/0232720 A1    Aug. 17, 2017

(30) Foreign Application Priority Data

Aug. 8, 2014 (JP) ................................. 2014-162360

(51) Int. Cl.
| | | |
|---|---|---|
| B32B 7/12 | (2006.01) | |
| B32B 27/30 | (2006.01) | |
| C09J 11/08 | (2006.01) | |
| C09J 133/00 | (2006.01) | |
| C08L 33/08 | (2006.01) | |
| C08L 93/00 | (2006.01) | |
| C08L 93/04 | (2006.01) | |
| C09J 133/08 | (2006.01) | |
| B32B 27/08 | (2006.01) | |
| B32B 27/20 | (2006.01) | |
| B32B 3/26 | (2006.01) | |
| C09J 7/20 | (2018.01) | |
| C09J 7/38 | (2018.01) | |
| C09J 7/24 | (2018.01) | |

(52) U.S. Cl.
CPC ............ *B32B 27/308* (2013.01); *B32B 3/26* (2013.01); *B32B 7/12* (2013.01); *B32B 27/08* (2013.01); *B32B 27/20* (2013.01); *B32B 27/30* (2013.01); *C08L 33/08* (2013.01); *C08L 93/00* (2013.01); *C08L 93/04* (2013.01); *C09J 7/20* (2018.01); *C09J 7/24* (2018.01); *C09J 7/385* (2018.01); *C09J 11/08* (2013.01); *C09J 133/00* (2013.01); *C09J 133/08* (2013.01); *B32B 2264/101* (2013.01); *B32B 2405/00* (2013.01); *C09J 2205/114* (2013.01); *C09J 2433/00* (2013.01); *C09J 2433/006* (2013.01)

(58) Field of Classification Search
None
See application file for complete search history.

(56) References Cited

U.S. PATENT DOCUMENTS

| | | | |
|---|---|---|---|
| 4,726,982 A | 2/1988 | Traynor et al. | |
| 4,818,610 A | 4/1989 | Zimmerman et al. | |
| 4,894,259 A | 1/1990 | Kuller | |
| 4,895,738 A | 1/1990 | Zimmerman et al. | |
| 5,753,362 A | 5/1998 | Kawase et al. | |
| 2009/0047500 A1* | 2/2009 | Maeda ............ | C08K 7/28 428/325 |
| 2009/0262735 A1 | 10/2009 | Shiraki | |
| 2010/0209703 A1* | 8/2010 | Takarada ......... | C09J 133/066 428/355 AC |
| 2010/0233466 A1* | 9/2010 | Higuchi .......... | C09J 133/26 428/323 |
| 2012/0177901 A1 | 7/2012 | Hirose et al. | |
| 2013/0017389 A1* | 1/2013 | Tamura ........... | C09J 7/22 428/314.4 |

FOREIGN PATENT DOCUMENTS

| | | |
|---|---|---|
| CN | 101831251 A | 9/2010 |
| EP | 2 228 418 A1 | 9/2010 |
| EP | 2 581 423 A1 | 4/2013 |
| JP | 63-118392 A | 5/1988 |
| JP | 63-308079 A | 12/1988 |
| JP | 8-53597 A | 2/1996 |
| JP | 2006-265368 A | 10/2006 |
| JP | 2007-224203 A | 9/2007 |
| JP | 2009-185229 A | 8/2009 |

(Continued)

OTHER PUBLICATIONS

Masayuki Okamoto et al., "Actylic Pressure Sensitive Adhesive Sheer", English translation of JP 2009-185229A, published Aug. 20, 2009. (Year: 2009).*
Istvan Benedek, Luc Heymans, "Pressure-Sensitive Adhesives Technology", 1997, Marcel Dekker, Inc., p. 77. (Year: 1997).*
Nagasaki Kunio et al., "Acrylic Pressure Sensitive Adhesive Sheet and Method for Producing the Same", machine translation of JP 2006-265368 A, published Oct. 5, 2006. (Year: 2006).*
International Search Report of PCT/JP2015/070096, dated Oct. 13, 2015. [PCT/ISA/210].
Communication dated May 11, 2018 from European Patent Office in counterpart application No. 15830491.5.
Extended European Search Report dated Jan. 22, 2018 from the European Patent Office in counterpart European application No. 15830491.5.

(Continued)

*Primary Examiner* — Anish P Desai
(74) *Attorney, Agent, or Firm* — Sughrue Mion, PLLC (57) ABSTRACT

Provided is a PSA sheet that shows high peel strength to low polar adherends while having excellent flexibility. This invention provides a PSA sheet that comprises a PSA layer (A) constituting an adhesive face and a viscoelastic layer (B) supporting the PSA layer (A). In the PSA sheet, the viscoelastic layer (B) comprises hollow particles or have bubbles. The PSA layer (A) comprises an acrylic polymer (a) as the base polymer. The copolymerization ratio of an acidic group-containing monomer in the acrylic polymer (a) is 5% by weight or lower.

9 Claims, 1 Drawing Sheet

(56) References Cited

FOREIGN PATENT DOCUMENTS

| | | |
|---|---|---|
| JP | 2009-260880 A | 11/2009 |
| JP | 2010-260880 A | 11/2010 |
| JP | 2011-84732 A | 4/2011 |
| JP | 2013-40329 A | 2/2013 |
| JP | 2013-213203 A | 10/2013 |
| JP | 2014-531500 A | 11/2014 |
| WO | 2013/048945 A1 | 4/2013 |

OTHER PUBLICATIONS

Decision to Grant a Patent dated Dec. 20, 2018 from the Japanese Patent Office in counterpart Japanese application No. 2014-162360.
Notification of Reasons for Refusal dated Aug. 16, 2018 from the Japanese Patent Office in counterpart Japanese application No. 2014-162360.
First Office Action dated Jun. 4, 2019, from The State Intellectual Property Office of the P.R. of China in counterpart Application No. 201580042270.1.

\* cited by examiner

PRESSURE-SENSITIVE ADHESIVE SHEET

TECHNICAL FIELD

The present invention relates to a pressure-sensitive adhesive sheet. The present application is a National Stage of International Application No. PCT/JP2015/070096 filed Jul. 14, 2015, claiming priority to Japanese Patent Application No. 2014-162360 filed on Aug. 8, 2014; and the entire contents thereof are incorporated herein by reference.

BACKGROUND ART

In general, pressure-sensitive adhesive (PSA) exists as a soft solid (a viscoelastic material) in a room temperature range and has a property to adhere easily to an adherend with some pressure applied. Taking advantage of such a property, PSA has been widely used as a means of attachment that offers excellent workability and produces dependable adhesion in various industrial fields from home appliances to automobiles, OA equipment, and so on. As the base polymer of PSA, a polymer that exhibits rubber elasticity at room temperature can be preferably used. Technical literatures related to PSA include Patent Documents 1 and 2. Patent Document 1 discloses a light-curable acrylic PSA. Patent Document 2 relates to a PSA sheet using a polyolefinic foam substrate which is non-viscoelastic.

CITATION LIST

Patent Literature

[Patent Document 1] Japanese Patent Application Publication No. 2011-84732
[Patent Document 2] Japanese Patent Application Publication No. 2013-40329

SUMMARY OF INVENTION

Technical Problem

PSA is typically formed as a film and used in a form of a PSA sheet including the PSA film (PSA layer). Various properties are demanded of a PSA sheet depending on its intended purpose. For instance, it is useful to have a PSA sheet that has high resistance to peeling from a low polar adherend (i.e. high peel strength) in addition to excellent flexibility.

An objective of the present invention is thus to provide a PSA sheet exhibiting high peel strength to a low polar adherend while having excellent flexibility.

Solution to Problem

The present invention provides a PSA sheet comprising a PSA layer (A) constituting an adhesive face and a viscoelastic layer (B) supporting the PSA layer (A). In the PSA sheet, the viscoelastic layer (B) comprises hollow particles or have bubbles. The PSA layer (A) comprises an acrylic polymer (a) as the base polymer. The copolymerization ratio of an acidic group-containing monomer in the acrylic polymer (a) is 5% by weight or lower.

The PSA sheet in this embodiment is provided with the viscoelastic layer (B) comprising hollow particles or having bubbles. Thus, due to the mechanical properties of the viscoelastic layer (B), the resistance to peel the adhesive face of the PSA layer (A) (peel strength, e.g. 90° peel strength measured based on the method described later in Examples) will increase. The inclusion of the viscoelastic layer (B) makes the PSA sheet highly flexible and effects such as increased surface conformability can be expected. For instance, hollow particles may serve as filler in the viscoelastic layer (B) to increase the shear strength of the viscoelastic layer (B). Increased shear strength of the viscoelastic layer (B) may advantageously contribute to an increase in peel strength. Since hollow particles have small specific gravities, the inclusion of hollow particles in the viscoelastic layer (B) is preferable also from the standpoint of reducing the weight of the PSA sheet. The PSA sheet having the bubble-containing viscoelastic layer (B) is likely to provide a great ability to conform to surface structures of adherends and maintain tight adhesion between the adhesive face and the adherend surface. This may advantageously contribute to increase the peel strength of the PSA sheet to various types of adherend including a low polar adherend. In addition, because the copolymerization ratio of the acidic group-containing monomer in the acrylic polymer (a) is reduced to or below the prescribed level, the tightness of adhesion to low polar adherends will increase further.

The viscoelastic layer (B) comprising hollow particles or having bubbles encompasses: an embodiment wherein the viscoelastic layer (B) comprises hollow particles while being essentially free of bubbles; an embodiment wherein it is essentially free of hollow particles while having bubbles; and an embodiment wherein it comprises hollow particles and also has bubbles. The acrylic polymer in which the copolymerization ratio of the acidic group-containing monomer is 5% by weight or lower encompasses an acrylic polymer obtained by polymerizing a starting monomer mixture that are essentially free of an acidic group-containing monomer, and an acrylic polymer obtained by polymerizing a starting monomer mixture that include an acidic group-containing monomer in an amount of 5% by weight or less.

In a preferable embodiment of the PSA sheet disclosed herein, the viscoelastic layer (B) comprises an acrylic polymer (b) as the base polymer. The viscoelastic layer (B) having such a composition is preferable because the flexibility and cohesion can be easily balanced. With the acrylic polymers included in both the PSA layer (A) and in the viscoelastic layer (B), the tightness of adhesion (level of anchoring) increases between the PSA layer (A) and the viscoelastic layer (B) and peeling between the PSA layer (A) and the viscoelastic layer (B), sometimes referred to as anchoring failure, is favorably inhibited during removal of the PSA sheet. This preferably combines removability and high peel strength relative to low polar adherends.

In a preferable embodiment of the PSA sheet disclosed herein, the acrylic polymer (b) is obtained by polymerizing a starting monomer mixture comprising an acidic group-containing monomer. In such an embodiment, while retaining adhesiveness to low polar adherends, the cohesion of the viscoelastic layer (B) that does not constitute an adhesive face will increase; and, for instance, increased shear strength and holding power can be expected. It is more preferable that the ratio (ACb/ACa) of the copolymerization ratio ACb of the acidic group-containing monomer in the acrylic polymer (b) to the copolymerization ratio ACa of the acidic group-containing monomer in the acrylic polymer (a) is 2 or higher.

In a preferable embodiment of the PSA sheet disclosed herein, the PSA layer (A) comprises at least one species of tackifier selected from the group consisting of a rosin-based tackifier resin, a terpene-based tackifier resin and a phenolic tackifier resin. The use of the tackifier will further increase the peel strength of the adhesive face of the PSA layer (A). The tackifier content in the PSA layer (A) is more preferably 10 parts to 50 parts by weight to 100 parts by weight of the base polymer.

In a preferable embodiment of the PSA sheet disclosed herein, the ratio ($T_B/T_A$) of the thickness $T_B$ of the viscoelastic layer (B) to the thickness $T_A$ of the PSA layer (A) is 12 or higher. In such an embodiment, the effects (increased flexibility, peel strength, conformability, etc.) of the viscoelastic layer (B) can be obtained to a greater extent. The limited thickness of the PSA layer (A) tends to lead to greater removability.

In a preferable embodiment of the PSA sheet disclosed herein, the adhesive face exhibits a 90° peel strength to polypropylene of 30 N/25 mm or greater. Higher peel strength to low polar adherends can be expected from a PSA sheet that exhibits such adhesive strength to polypropylene which is a typical low polar material.

EMBODIMENT OF DESCRIPTION

Preferred embodiments of the present invention are described below. Matters necessary to practice this invention other than those specifically referred to in this description may be understood to a person of ordinary skill in the art based on the disclosures regarding the implementation of this invention according to the present description and technical common knowledge at the time of filing of this application. The present invention can be practiced based on the contents disclosed in this description and common technical knowledge in the subject field.

In the drawings referenced below, a common reference numeral may be assigned to members or sites producing the same effects, and duplicated descriptions are sometimes omitted or simplified. The embodiments described in the drawings are schematized for clear illustration of the present invention, and do not represent the accurate sizes or reduction scales of the PSA sheet to be provided as an actual product by the present invention.

As used herein, the term "PSA" refers to, as described earlier, a material that exists as a soft solid (a viscoelastic material) in a room temperature range and has a property to adhere easily to an adherend with some pressure applied. As defined in "*Adhesion: Fundamental and Practice*" by C. A. Dahlquist (McLaren & Sons (1966), P. 143), PSA referred to herein is generally a material that has a property satisfying complex tensile modulus $E^*(1\ Hz)<10^7$ dyne/cm$^2$ (typically, a material that exhibits the described characteristics at 25° C.). The PSA in the art disclosed herein can be considered as non-volatiles in a PSA composition or the constituent of a PSA layer.

The term "base polymer" of a PSA refers to the primary component among the polymers (typically the polymers that exhibit rubber elasticity in a room temperature range) contained in the PSA (i.e. the major component among the polymers, typically a component accounting for more than 50% by weight).

<Basic Constitution of PSA Sheet>

The PSA sheet disclosed herein comprises a PSA layer (A) constituting an adhesive face and a viscoelastic layer (B) supporting the PSA layer (A). The PSA layer (A) supported on the viscoelastic layer (B) forms at least one surface (one face or both faces) of the PSA sheet. The concept of PSA sheet herein encompasses those so-called PSA tapes, PSA labels, PSA films, etc. The PSA sheet provided by this description can be in a roll form or in a flat sheet form. Alternatively, the PSA sheet may be processed into various other forms.

Figure 1:
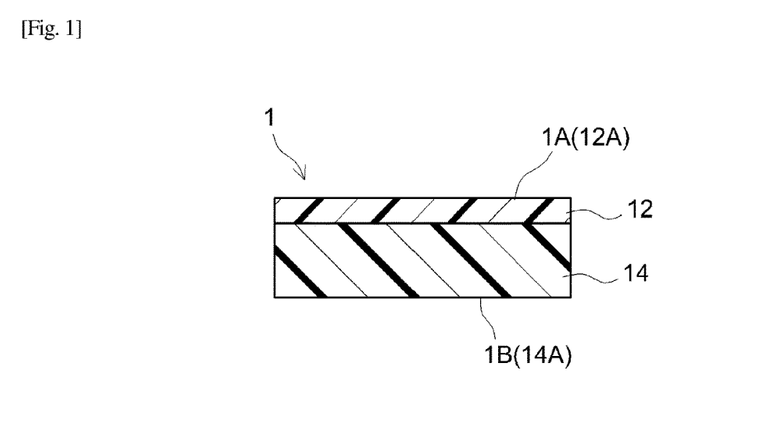
FIG. 1 shows a cross-sectional view schematically illustrating the constitution of a PSA sheet according to an embodiment.
Figure 2:
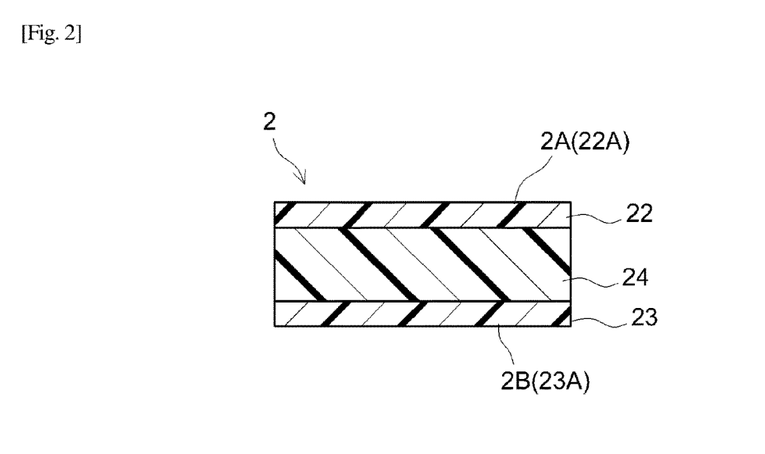
FIG. 2 shows a cross-sectional view schematically illustrating the constitution of a PSA sheet according to another embodiment.
Figure 3:
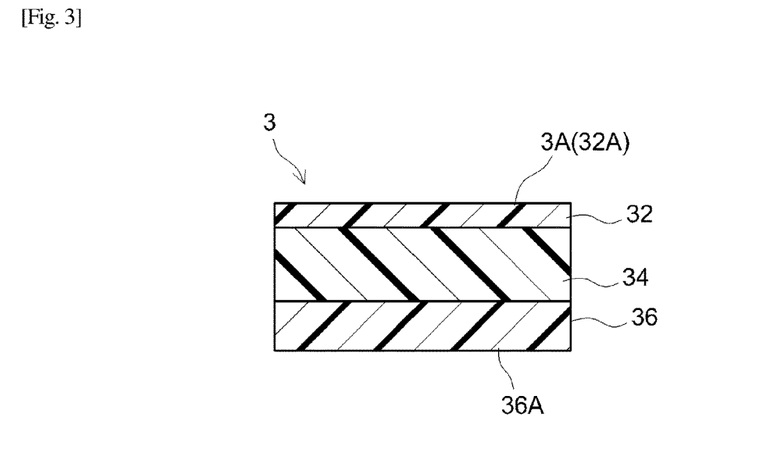
FIG. 3 shows a cross-sectional view schematically illustrating the constitution of a PSA sheet according to another embodiment.

FIG. 1 to FIG. 3 schematically show typical constitution examples of the PSA sheet disclosed herein.

PSA sheet 1 shown in FIG. 1 is a double-faced PSA sheet comprising a PSA layer (A) 12, and a viscoelastic layer (B) 14 supporting the back face thereof. Viscoelastic layer (B) 14 is an adhesive layer. The first surface (first adhesive face) 1A of PSA sheet 1 is constituted with surface 12A of PSA layer (A) 12 while the second surface (second adhesive face) 1B of PSA sheet 1 is constituted with surface 14A of viscoelastic layer (adhesive layer) (B) 14. In PSA sheet 1 having such a constitution, the first adhesive face 1A may exhibit good adhesiveness to a low polar adherend. Since PSA sheet 1 comprises a viscoelastic layer (B) 14, it may have excellent flexibility. Taking advantage of such a feature, PSA sheet 1 can be preferably used, for instance, in an embodiment where the first adhesive face 1A is adhered to a low polar adherend such as a polyolefin resin and the like while the second adhesive face 1B is adhered to various types of adherend. PSA sheet 1 is preferable, for instance, as a double-faced PSA sheet for tightly joining various types of adherend to a low polar adherend.

PSA sheet 2 shown in FIG. 2 is a double-faced PSA sheet formed of a first PSA layer (A) 22, a second PSA layer (A) 23 and a viscoelastic layer (B) 24 placed between the two. Viscoelastic layer (B) 24 may be an adhesive layer or a non-adhesive layer. The first surface (first adhesive face) 2A of PSA sheet 2 is formed with surface 22A of the first PSA layer (A) 22 supported with the first face of viscoelastic layer (B) 24. The second surface (second adhesive face) 2B of PSA sheet 2 is formed with surface 23A of the second PSA layer (A) 23 supported with the second face of viscoelastic layer (B) 24. In PSA sheet 2 having such a constitution, both the first adhesive face 2A and second adhesive face 2B may exhibit good adhesiveness to a low polar adherend. Since PSA sheet 2 includes the viscoelastic layer (B) 24, it may have excellent flexibility. Taking advantage of such a feature, PSA sheet 2 may be preferably used, for instance, in an embodiment where the first adhesive face 2A and second adhesive face 2B are adhered to low polar adherends, respectively. PSA sheet 2 is preferable, for instance, as a double-faced PSA sheet for tightly joining low polar adherends together.

PSA sheet 3 shown in FIG. 3 is a single-faced PSA sheet comprising a PSA layer (A) 32, a viscoelastic layer (B) 34 supporting the back face thereof, and a support substrate 36 further supporting the back face thereof. Viscoelastic layer (B) 34 is typically an adhesive layer. PSA sheet 3 comprises an adhesive face 3A formed with surface 32A of PSA layer (A) 32. PSA sheet 3 having such a constitution can be preferably used, for instance, in an embodiment where the adhesive face 3A is adhered to a low polar adherend.

In the respective PSA sheets 1 to 3 shown in FIGS. 1 to 3, each of viscoelastic layers (B) 14, 24 and 34 may comprise bubbles, hollow particles, or both bubbles and hollow particles. From the standpoint of reducing the weight of the PSA sheet, preferable examples include an embodiment where the viscoelastic layer (B) comprises at least bubbles or hollow particles, an embodiment where the viscoelastic layer (B) comprises at least hollow particles, and an embodiment where the viscoelastic layer (B) comprises bubbles and hollow particles.

Hollow particles or bubbles included in the viscoelastic layer (B) may decrease smoothness of the surface of the viscoelastic layer (B), depending on their size or amount included. If the surface smoothness of the viscoelastic layer (B) decreases, for instance, when the viscoelastic layer (B) is an adhesive layer and its surface is directly adhered to an adherend, tight adhesion to the adherend may tend to be insufficient, and the peel strength may tend to decrease. In the PSA sheet disclosed herein, a PSA layer (A) constituting an adhesive face is placed on the viscoelastic layer (B). Accordingly, the tightness of adhesion between an adherend and the adhesive face is less susceptible to influence by the surface smoothness of the viscoelastic layer (B). Thus, the proportion of hollow particles or bubbles in the viscoelastic layer (B) can be easily adjusted and a PSA sheet with well-balanced properties can be suitably obtained.

In PSA sheets 1 to 3 exemplified in FIGS. 1 to 3, each layer shown in the drawings may have a single-layer structure or multi-layer structure consisting of two or more sub-layers (i.e. a structure including multiple sub-layers). For instance, each of the PSA layers (A) 12, 22, 23 and 32 may be formed of a PSA layer (A) having a single-layer structure or having multi-layer structure consisting of two or more sub-layers, or may be provided with a PSA layer (A) on each face of the support substrate.

The PSA sheets 1 to 3 exemplified in FIGS. 1 to 3 each may further have a layer not shown in the drawings. For instance, other layer(s) may be placed between any layers in FIGS. 1 to 3. An example of such a constitution is a constitution where a second PSA layer (A) is further placed between viscoelastic layer (B) 34 and support substrate 36. For instance, the PSA sheet disclosed herein may comprise a PSA layer not exposed on the surface of the PSA sheet (i.e. not constituting an adhesive face) in addition to the PSA layer (A) constituting an adhesive face such as the aforementioned second PSA layer (A). The other layer can be other than a PSA layer. For instance, it can be plastic film, a primer layer, an undercoat layer, a release layer, a colored layer such as a printed layer, a metal deposition layer, an antistatic layer, a surface-protecting layer, etc. Alternatively, the PSA sheets 1 to 3 disclosed herein may be free of primer layers and undercoat layers. The art disclosed herein can be preferably implemented in an embodiment where no primer layer is included between the adherend surface not shown in the drawings and the adhesive faces 12A, 22A, 23A or 32A. For instance, in the PSA sheet, even if it is in an embodiment where no undercoat layer is present between the PSA layer (A) and the viscoelastic layer (B), the art disclosed herein can be preferably practiced without causing anchoring failure (peeling between the PSA layer (A) and viscoelastic layer (B)) during removal of the PSA sheet.

<Viscoelastic Layer (B)>
[Base Polymer (b)]

While the composition of the viscoelastic layer (B) exhibits viscoelastic properties in a temperature range around room temperature, there are no particular limitations to the composition. The viscoelastic layer (B) may comprise one, two or more species selected from various viscoelastic materials such as acrylic viscoelastic materials, rubber-based viscoelastic materials, silicone-based viscoelastic materials, polyester-based viscoelastic materials, urethane-based viscoelastic materials, polyether-based viscoelastic materials, polyamide-based viscoelastic materials, fluorine-based viscoelastic materials, and the like. Herein, the term acrylic viscoelastic material refers to a viscoelastic material comprising an acrylic polymer as the base polymer (primary component among the polymers, i.e. the major component among the polymers, typically a component accounting for more than 50% of the content). The same applies to the rubber-based and other viscoelastic materials. It is noted that the viscoelastic material referred to herein is a material combining viscous and elastic properties, that is, a material having properties satisfying that the complex modulus of elasticity has a phase angle above zero, but below $\pi/2$ (typically, a material having such properties at 25° C.). From the standpoint of the flexibility, etc., a preferable material has properties satisfying a complex modulus of elasticity $E^*(1\text{ Hz}) < 10^7$ dyne/cm$^2$ (typically, a material having such property at 25° C.).

The viscoelastic layer (B) may be an adhesive layer or a non-adhesive layer. The term "adhesive layer" herein refers to a layer having a peel strength of 0.1 N/20 mm or greater when measured based on JIS Z 0237 (2009), such that with a SUS304 stainless steel plate being an adherend, 30 minutes after press-bonded to the adherend with a 2 kg roller moved back and forth once in a measurement environment at 23° C., the layer is peeled in the 180° direction at a tensile speed of 300 mm/min. It is also referred to as a PSA layer. The term "non-adhesive layer" refers to a layer that is not considered as the adhesive layer, typically with the peel strength being below 0.1 N/20 mm. A layer that does not bond to a SUS304 stainless steel plate when press-bonded to the stainless steel plate with a 2 kg roller moved back and forth once at 23° C. (i.e. a layer that is essentially non-adhesive or not sticky) is a typical example included in the concept of the non-adhesive layer referred to herein. Although not particularly limited, the art disclosed herein can be preferably implemented in an embodiment comprising a viscoelastic layer (B) that is also an adhesive layer, that is, an embodiment comprising a PSA layer (B) as the viscoelastic layer (B).

In a preferable embodiment, the viscoelastic layer (B) may be a layer comprising an acrylic polymer (b) as the base polymer (b), that is, an acrylic viscoelastic layer. A viscoelastic layer (B) having such a composition is preferable since the balance between flexibility and cohesiveness can be readily adjusted. With the acrylic polymers included in both the PSA layer (A) and the viscoelastic layer (B), the tightness of adhesion between the two layers will increase and anchoring failure can be preferably inhibited during removal of the PSA sheet. The acrylic polymer (b) content of the viscoelastic layer (B) is not particularly limited. It is typically 50% by weight or greater, preferably 70% by weight or greater, or more preferably 80% by weight or greater.

As the acrylic polymer (b), for example, a polymer of a starting monomer mixture comprising an alkyl (meth)acrylate as the primary monomer and possibly further comprising a secondary monomer copolymerizable with the primary monomer is preferable. The primary monomer herein refers to a component that accounts for more than 50% by weight of all the monomers contained in the starting monomer mixture. In typical, the composition of monomers contained in the starting monomer mixture is approximately equivalent to the composition of monomeric units contained in the acrylic polymer (b).

As the alkyl (meth)acrylate, for instance, a compound represented by the following general formula (1) can be used:

$$CH_2=C(R^1)COOR^2 \quad (1)$$

Herein, $R^1$ in the formula (1) is a hydrogen atom or a methyl group. $R^2$ is an alkyl group having 1 to 20 carbon atoms (hereinafter, such a range of the number of carbon atoms may be indicated as "$C_{1-20}$"). From the standpoint of the storage elastic modulus of PSA, an alkyl (meth)acrylate with $R^2$ being a $C_{1-14}$ alkyl group is preferable, an alkyl (meth)acrylate with $R^2$ being a $C_{1-10}$ alkyl group is more preferable, and an alkyl (meth)acrylate with $R^2$ being a butyl group or a 2-ethylhexyl group is particularly preferable.

Examples of an alkyl (meth)acrylate with $R^2$ being a $C_{1-20}$ alkyl group include methyl (meth)acrylate, ethyl (meth) acrylate, propyl (meth)acrylate, isopropyl (meth)acrylate, n-butyl (meth)acrylate, isobutyl (meth)acrylate, s-butyl (meth)acrylate, pentyl (meth)acrylate, isopentyl (meth)acrylate, hexyl (meth)acrylate, heptyl (meth)acrylate, 2-ethylhexyl (meth)acrylate, octyl (meth)acrylate, isooctyl (meth) acrylate, nonyl (meth)acrylate, isononyl (meth)acrylate, decyl (meth)acrylate, isodecyl (meth)acrylate, undecyl (meth)acrylate, lauryl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, eicosyl (meth)acrylate, etc. Among these alkyl (meth)acrylates, can be used one species solely or a combination of two or more species. Particularly preferable alkyl (meth)acrylates include n-butyl acrylate (BA) and 2-ethylhexyl acrylate (2EHA).

Although not particularly limited, the amount of the alkyl (meth)acrylate can be, for instance, 60% by weight or more of all the monomers constituting the acrylic polymer (b), or it is usually preferably 70% by weight or more, or more preferably 80% by weight or more. From the standpoint of the cohesive strength of the viscoelastic layer (B), etc., the amount of the acrylic (meth)acrylate is suitably 99.5% by weight or less, preferably 99% by weight or less, or more preferably 95% by weight or less.

Examples of the secondary monomer include a monomer having a functional group (or a "functional group-containing monomer" hereinafter). Such a functional group-containing monomer can be used to introduce crosslinking points in the acrylic polymer (b) so as to increase the cohesive strength of the viscoelastic layer (B). Examples of such a functional group-containing monomer include the following:

Carboxyl group-containing monomers including ethylenic unsaturated monocarboxylic acids such as acrylic acid (AA), methacrylic acid (MAA), crotonic acid, carboxyethyl (meth)acrylate, carboxypentyl (meth)acrylate, etc.; ethylenic unsaturated dicarboxylic acids such as itaconic acid, maleic acid, fumaric acid, and citraconic acid as well as their metal salts (e.g. alkali metal salts);

Acid anhydride group-containing monomers including acid anhydrides of the ethylenic unsaturated dicarboxylic acids such as maleic anhydride, and itaconic anhydride;

Hydroxyl group-containing monomers including hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 6-hydroxyhexyl (meth) acrylate, 8-hydroxyoctyl (meth)acrylate, 10-hydroxydecyl (meth)acrylate, 12-hydroxylauryl (meth)acrylate, and (4-hydroxymethylcyclohexyl)methyl (meth)acrylate; unsaturated alcohols such as N-methylol(meth)acrylamide, vinyl alcohol, allyl alcohol, 2-hydroxyethyl vinyl ether, 4-hydroxybutyl vinyl ether, and diethylene glycol monovinyl ether;

Amide group-containing monomers such as (meth)acrylamide, N,N-dimethyl(meth)acrylamide, N-butyl(meth)acrylamide, N-methylol(meth)acrylamide, N-methylolpropane (meth)acrylamide, N-methoxymethyl(meth)acrylamide, and N-butoxymethyl(meth)acrylamide;

Cyano group-containing monomers such as acrylonitrile and methacrylonitrile;

Sulfonic acid group-containing monomers such as styrene sulfonic acid, allyl sulfonic acid, 2-(meth)acrylamido-2-methylpropanesulfonic acid, (meth)acrylamidopropanesulfonic acid, sulfopropyl (meth)acrylate, and (meth)acryloxynaphthalene sulfonic acid;

Phosphoric acid group-containing monomers such as 2-hydroxyethyl acryloyl phosphate;

Oxazoline group-containing monomers such as 2-vinyl-2-oxazoline, 2-vinyl-5-methyl-2-oxazoline, and 2-isopropenyl-2-oxazoline;

Aziridine group-containing monomers such as (meth) acryloylaziridine and 2-aziridinylethyl (meth)acrylate;

Amino group-containing monomers such as aminoethyl (meth)acrylate, N,N-dimethylaminoethyl (meth)acrylate, N,N-dimethylaminopropyl (meth)acrylate and t-butylaminoethyl (meth)acrylate;

Epoxy group-containing (glycidyl group-containing) monomers such as glycidyl (meth)acrylate, methylglycidyl (meth)acrylate and allyl glycidyl ether;

Keto group-containing monomers such as diacetone (meth)acrylamide, diacetone (meth)acrylate, vinyl methyl ketone, vinyl ethyl ketone, allyl acetoacetate and vinyl acetoacetate;

Isocyanate group-containing monomers such as 2-(meth) acryloyloxyethyl isocyanate;

Alkoxyl group-containing monomers such as methoxyethyl (meth)acrylate, ethoxyethyl (meth)acrylate, propoxyethyl (meth)acrylate, butoxyethyl (meth)acrylate and ethoxypropyl (meth)acrylate; and Alkoxysilyl group-containing monomers such as (3-(meth)acryloxypropyl)trimethoxysilane, (3-(meth)acryloxypropyl)triethoxysilane, (3-(meth)acryloxypropyl)methyldimethoxysilane and (3-(meth)acryloxypropyl)methyldiethoxysilane.

Other examples include a macromonomer having a radically polymerizable vinyl group at the monomer end-group in a vinylic polymer.

These can be used singly as one species or in combination of two or more species.

When a functional group-containing monomer as those described above is used as the secondary monomer, its amount used can be suitably selected so as to obtain desirable cohesive strength, and it is not particularly limited. The amount of the functional group-containing monomer used can be, for instance, 0.5% by weight or more of all the monomers constituting the acrylic polymer. It is usually suitably 1% by weight or more, preferably 3% by weight or more, or more preferably 5% by weight or more. From the standpoint of combining flexibility and cohesive strength at a good balance, the amount of the functional group-containing monomer is suitably 30% by weight or less of all the monomers, preferably 25% by weight or less, or more preferably 20% by weight or less.

In a preferable embodiment, the acrylic polymer (b) disclosed herein is obtained by polymerizing a starting monomer mixture that comprises an acidic group-containing monomer. This may allow for preferable adjustment of the balance between the flexibility and cohesion of the viscoelastic layer (B). Typical examples of the acidic group-containing monomer include various carboxy group-containing monomers and metal salts (e.g. alkali metal salts) thereof as well as acid anhydride group-containing monomers. As for specific examples of these acidic group-containing monomers, one, two or more species can be preferably used among those exemplified earlier as carboxy group-containing monomers, metal salts (e.g. alkali metal salts) thereof and acid anhydride group-containing monomers. In particular, AA and MAA are more preferable.

When an acidic group-containing monomer is used, it can be used in an amount suitably selected so as to obtain desirable cohesive strength; the amount is not particularly limited. The acidic group-containing monomer can be used in an amount of, for instance, suitably 1% by weight or more of all the monomers forming the acrylic polymer (b), or usually preferably 3% by weight or more (e.g. 5% by weight or more, typically 8% by weight or more). From the standpoint of combining flexibility and cohesive strength in a well-balanced manner, the amount of the acidic group-containing monomer is suitably 25% by weight or less (e.g. 20% by weight or less, typically 15% by weight or less) of all the monomers.

In order to adjust the glass transition temperature (Tg) or to increase the cohesive strength, etc., the starting monomer mixture may comprise secondary monomer(s) other than the aforementioned functional group-containing monomer. Examples of such secondary monomers include the following:

Carboxylic acid vinyl esters such as vinyl acetate (VAc), vinyl propionate, vinyl lactate, vinyl pyvalate, vinyl cyclohexanecarboxylate and vinyl benzoate;

Aromatic vinyl compounds such as styrene, substituted styrenes (α-methylstyrene, etc.) and vinyl toluene;

Aromatic ring-containing (meth)acrylates such as aryl (meth)acrylate (e.g. phenyl (meth)acrylate), aryloxyalkyl (meth)acrylate (e.g. phenoxyethyl (meth)acrylate) and arylalkyl (meth)acrylate (e.g. benzyl (meth)acrylate);

Monomers having nitrogen atom-containing rings such as N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-vinylmorpholine, N-vinylcaprolactam and N-(meth)acryloyl morpholine;

Olefinic monomers such as ethylene, propylene, isoprene, butadiene and isobutylene;

Chlorine-containing monomers such as vinyl chloride and vinylidene chloride; and Vinyl ether-based monomers such as methyl vinyl ether and ethyl vinyl ether.

These can be used singly as one species or in combination of two or more species. The amount of such secondary monomer(s) used can be suitably selected depending on the purpose and application, and is not particularly limited. For example, it is preferably 10% by weight or less of all the monomers.

The starting monomer mixture may comprise as necessary a polyfunctional monomer for crosslinking, etc. Examples of such a polyfunctional monomer include monomers having two or more polymerizable functional groups (typically (meth)acryloyl groups) per molecule, such as 1,6-hexanediol di(meth)acrylate, ethylene glycol di(meth)acrylate, propylene glycol di(meth)acrylate, polyethylene glycol di(meth)acrylate, polypropylene glycol di(meth)acrylate, neopentyl glycol di(meth)acrylate, pentaerythritol di(meth) acrylate, trimethylolpropane tri(meth)acrylate, ethyleneoxide-modified trimethylolpropane tri(meth)acrylate, pentaerythritol tri(meth)acrylate, dipentaerythritol penta(meth) acrylate, dipentaerythritol hexa(meth)acrylate, etc. These can be used singly as one species or in combination of two or more species. From the standpoint of the reactivity, etc., it is usually preferable to use a polyfunctional monomer having two or more (typically three or more) acryloyl groups per molecule. When such a polyfunctional monomer is used, its amount used is not particularly limited. From the standpoint of the flexibility of the viscoelastic layer (B), it is usually suitable to be 2% by weight or less (more preferably 1% by weight or less) of all the monomers.

The monomer composition of the acrylic polymer (b) can be selected so that the resulting acrylic polymer (b) has a Tg of, for instance, −70° C. or above, but −10° C. or below. From the standpoint of the flexibility, the acrylic polymer (b) has a Tg of suitably −20° C. or below, preferably −30° C. or below, more preferably −40° C. or below, or yet more preferably −50° C. or below. From the standpoint of the cohesive strength of the viscoelastic layer (B), the Tg is usually preferable to be −65° C. or above.

Herein, the Tg of the acrylic polymer (b) refers to a value determined by the Fox equation based on the Tg values of homopolymers of the respective monomers constituting the acrylic polymer (b) and weight fractions (copolymer ratio by weight) of the monomers. Thus, the Tg of an acrylic polymer (b) can be adjusted by suitably modifying the monomer composition (i.e. types and relative amounts of monomers used for the synthesis of the acrylic polymer (b)). As the Tg values of homopolymers, values given in a known document are used.

In the art disclosed herein, as the Tg values of the homopolymers, the following values are used specifically:

2-ethylhexyl acrylate −70° C.
n-butyl acrylate −55° C.
2-hydroxyethyl acrylate −15° C.
vinyl acetate 32° C.
acrylic acid 106° C.
methacrylic acid 228° C.

With respect to the Tg values of homopolymers other than the examples listed above, the values given in "Polymer Handbook" (3rd edition, John Wiley & Sons, Inc., Year 1989) are used.

When no values are given in "Polymer Handbook", the values obtained by the following measurement method are used (see JP2007-51271A).

In particular, to a reaction vessel equipped with a thermometer, a stirrer, a nitrogen inlet and a condenser, are added 100 parts by weight of monomer(s), 0.2 part by weight of azobisisobutyronitrile, and 200 parts by weight of ethyl acetate as a polymerization solvent, and the mixture is stirred for one hour under a nitrogen gas flow. After oxygen is removed in this way from the polymerization system, the mixture is heated to 63° C. and the reaction is carried out for 10 hours. Then, it is cooled to room temperature, and a homopolymer solution having 33% by weight solid content is obtained. Then, this homopolymer solution is applied onto a release liner by flow coating and allowed to dry to prepare a test sample (a homopolymer sheet) of about 2 mm thickness. This test sample is cut out into a disc of 7.9 mm diameter and is placed between parallel plates; and while applying a shear strain at a frequency of 1 Hz using a rheometer (ARES, available from Rheometrics Scientific, Inc.), the viscoelasticity is measured in the shear mode over a temperature range of −70° C. to 150° C. at a heating rate of 5° C./min; and the temperature value at the peak of the tan δ curve is taken as the Tg of the homopolymer.

The acrylic polymer (b) can be prepared by a known or commonly-used polymerization method. As the polymerization method, can be suitably employed, for instance, thermal polymerization (typically carried out in the presence of a thermal polymerization initiator) such as solution polymerization, emulsion polymerization, bulk polymerization, etc.; active energy ray polymerization carried out by irradiating an active energy ray including lights such as ultraviolet rays (UV), etc., as well as radioactive rays such as β rays, γ rays, etc.; and the like. Examples of the active energy ray polymerization referred to herein include photopolymerization carried out by irradiating light such as UV (typically carried out in the presence of a photopolymerization initiator) as well as radiation polymerization carried out by irradiating ionizing radiation such as α rays, β rays, γ rays, neutron beams, electron beams, etc. These polymerization methods can be used singly as one type or in combination of two or more different types.

For the polymerization, depending on the polymerization method and embodiment, etc., a known or commonly-used polymerization initiator can be used. For the polymerization initiator, solely one species or a combination of two or more species can be used.

For advantages such as shortened polymerization time, etc., a photopolymerization initiator can be preferably used. Examples of the photopolymerization initiator include, but not particularly limited to ketal-based photopolymerization initiators, acetophenone-based photopolymerization initiators, benzoin ether-based photopolymerization initiators, acylphosphine oxide-based photopolymerization initiators, α-ketol-based photopolymerization initiators, aromatic sulfonyl chloride-based photopolymerization initiators, photoactive oxime-based photopolymerization initiators, benzoin-based photopolymerization initiators, benzil-based photopolymerization initiators, benzophenone-based photopolymerization initiators, thioxanthone-based photopolymerization initiators and the like.

Specific examples of ketal-based photopolymerization initiators include 2,2-dimethoxy-1,2-diphenylethane-1-one (e.g. trade name IRGACURE 651 available from BASF Japan Ltd.).

Specific examples of acetophenone-based photopolymerization initiators include 1-hydroxycyclohexyl phenyl ketone (e.g. trade name IRGACURE 184 available from BASF Japan Ltd.), 4-phenoxydichloroacetophenone, 4-t-butyl-dichloroacetophenone, 1-[4-(2-hydroxyethoxy)-phenyl]-2-hydroxy-2-methyl-1-propane-1-one (e.g. trade name IRGACURE 2959 available from BASF Japan Ltd.), 2-hydroxy-2-methyl-1-phenyl-propane-1-one (e.g. trade name DAROCUR 1173 available from BASF Japan Ltd.) and methoxyacetophenone.

Specific examples of benzoin ether-based photopolymerization initiators include benzoin ethers such as benzoin methyl ether, benzoin ethyl ether, benzoin propyl ether, benzoin isopropyl ether, and benzoin isobutyl ether as well as substituted benzoin ethers such as anisole methyl ether.

Specific examples of acylphosphine oxide-based photopolymerization initiators include bis(2,4,6-trimethylbenzoyl)phenylphosphine oxide (e.g. trade name IRGACURE 819 available from BASF Japan Ltd.), bis(2,4,6-trimethylbenzoyl)-2,4-di-n-butoxyphenylphosphine oxide, 2,4,6-trimethylbenzoyldiphenylphosphine oxide (e.g. trade name LUCIRIN TPO available from BASF Japan Ltd.) and bis(2,6-dimethoxybenzoyl)-2,4,4-trimethylpentylphosphine oxide.

Specific examples of α-ketol-based photopolymerization initiators include 2-methyl-2-hydroxypropiophenone and 1-[4-(2-hydroxyethyl)phenyl]-2-methylpropane-1-one. Specific examples of aromatic sulfonyl chloride-based photopolymerization initiators include 2-naphthalenesulfonyl chloride. Specific examples of photoactive oxime-based photopolymerization initiators include 1-phenyl-1,1-propanedione-2-(o-ethoxycarbonyl)-oxime. Specific examples of benzoin-based photopolymerization initiators include benzoin. Specific examples of benzil-based photopolymerization initiators include benzil.

Specific examples of benzophenone-based photopolymerization initiators include benzophenone, benzoylbenzoic acid, 3,3'-dimethyl-4-methoxybenzophenone, polyvinylbenzophenone and α-hydroxycyclohexylphenylketone.

Specific examples of thioxanthone-based photopolymerization initiators include thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, isopropylthioxanthone and 2,4-diisopropylthioxanthone, dodecylthioxanthone.

The initiator for thermal polymerization is not particularly limited. For example, can be used an azo-based polymerization initiator, peroxide-based polymerization initiator, a redox-based polymerization initiator by combination of a peroxide and a reducing agent, a substituted ethane-based polymerization initiator, etc. More specific examples include, but not limited to azo-based initiators such as 2,2'-azobisisobutyronitrile, 2,2'-azobis(2-methylpropionamidine) disulfate, 2,2'-azobis(2-amidinopropane) dihydrochloride, 2,2'-azobis[2-(5-methyl-2-imidazolin-2-yl)propane]dihydrochloride, 2,2'-azobis(N,N'-dimethyleneisobutylamidine), 2,2'-azobis[N-(2-carboxyethyl)-2-methylpropionamidine] hydrate, etc.; persulfates such as potassium persulfate, ammonium persulfate, etc.; peroxide-based initiators such as benzoyl peroxide, t-butyl hydroperoxide, hydrogen peroxide, etc.; substituted ethane-based initiators such as phenyl-substituted ethane, etc.; redox-based initiators such as combination of a persulfate salt and sodium hydrogen sulfite, combination of a peroxide and sodium ascorbate, etc.; and the like. Thermal polymerization can be preferably carried out at a temperature of, for instance, about 20° C. to 100° C. (typically 40° C. to 80° C.).

Such thermal polymerization initiator or photopolymerization initiator can be used in a typical amount in accordance with the polymerization method or embodiment, etc., without particular limitations. For example, to 100 parts by weight of the starting monomer mixture, an initiator can be used at 0.001 to 5 parts by weight (typically, 0.01 to 2 parts by weight, e.g. 0.01 to 1 part by weight).

As the composition for forming the viscoelastic layer (B), can be preferably used a composition comprising a partially-polymerized product obtained by partially polymerizing the monomers. Such a partially-polymerized product typically has a syrup form (viscous liquid form) in which a polymer formed from part of the monomers and unreacted monomers are present as a mixture. Hereinafter, a partially-polymerized product having such a form may be referred to as "monomer syrup" or simply "syrup". The polymerization method for obtaining the partially-polymerized product is not particularly limited. A suitable method can be selected and employed among various polymerization methods as those described earlier. From the standpoint of the efficiency and convenience, a photopolymerization method can be preferably employed. According to a photopolymerization, depending on the polymerization conditions such as irradiation dose (light quantity), etc., the polymer conversion of the monomer mixture can be easily controlled.

The composition for forming the viscoelastic layer (B) (viscoelastic layer forming composition) may be in a form comprising an acrylic polymer (b) (e.g. acrylic polymer at 95% by weight or higher polymer conversion of the monomers) as a fully-polymerized product of the monomers. For instance, it may be in a form of a solvent-based composition comprising such an acrylic polymer (b) in an organic solvent, a water-dispersed composition such that the acrylic polymer (b) is dispersed in an aqueous solvent, etc.

The composition for forming the viscoelastic layer (B) may comprise a crosslinking agent. As the crosslinking agent, can be used a crosslinking agent commonly known or used in the acrylic PSA field. Examples include epoxy-based crosslinking agents, isocyanate-based crosslinking agents, silicone-based crosslinking agents, oxazoline-based crosslinking agents, aziridine-based crosslinking agents, silane-based crosslinking agents, alkyletherified melamine-based crosslinking agent, metal chelate-based crosslinking agent, and the like. Alternatively, the composition may be essentially free of such a crosslinking agent.

[Filler]

The viscoelastic layer (B) may comprise filler. The inclusion of filler in a viscoelastic layer (B) can increase the shear strength of the viscoelastic layer (B). This may increase the resistance against peeling the PSA sheet from an adherend (peel strength). The use of a filler can suppress excessive deformation of the viscoelastic layer (B), allowing for suitable adjustment of the balance between flexibility and cohesive strength of the PSA sheet as a whole.

As the filler, various particulate substances can be used. Examples of a material constituting such a particulate substance include metals such as copper, nickel, aluminum, chromium, iron and stainless steel; metal oxides such as alumina, zirconia, etc.; carbides such as silicon carbide, boron carbide and nitrogen carbide; nitrides such as aluminum nitride, silicon nitride and boron nitride; other inorganic materials such as calcium carbide, calcium carbonate, aluminum hydroxide, glass and silica; and polymers such as a polystyrene, acrylic resin (e.g. poly(methyl methacrylate)), phenol resin, benzoguanamine resin, urea resin, silicone resin, polyester, polyurethane, polyethylene, polypropylene, polyamide (e.g. nylon), polyimide and polyvinylidene chloride. Alternatively, particles of natural materials such as volcanic shirasu, sand and the like can be used. These can be used singly as one species or in combination of two or more species.

The external form of the particulate substance and the particle structure are not particularly limited. The external form of the particulate substance may be globular, flaky, irregularly-shaped, etc. The particle structure of the particulate substance may be, for instance, dense, porous, hollow, etc.

The art disclosed herein may be preferably implemented in an embodiment where the viscoelastic layer (B) comprises as the filler a particulate substance having a hollow particle structure (or "hollow particles" hereinafter). From the standpoint of the photopolymerizability (polymerization reactivity) of the viscoelastic layer-forming composition, hollow particles formed from an inorganic material can be preferably used. Examples of such hollow particles include balloons made of glass such as hollow glass balloons; hollow balloons made of a metal oxide such as hollow alumina balloons; hollow balloons made of ceramic such as hollow ceramic balloons.

As the hollow glass balloon, can be used commercial products such as trade names GLASS MICRO BALLOON, FUJI BALLOON H-40 and FUJI BALLOON H-35 available from Fuji Silysia Chemical Ltd.; trade names CEL-STAR Z-20, CEL-STAR Z-27, CEL-STAR CZ-31T, CEL-STAR Z-36, CEL-STAR Z-39, CEL-STAR T-36 and CEL-STAR PZ-6000 available from Tokai Kogyo Co. Ltd.; trade names SEILAX FINE BALLOON available from Fine Balloon KK; trade names Q-CEL® 5020, Q-CEL® 7014, SPHERICEL® 110P8, SPHERICEL® 25P45, SPHERICEL® 34P30 and SPHERICEL® 60P18 available from Potters-Ballotini Co., Ltd.; trade names SUPER BALLOON BA-15 and SUPER BALLOON 732C available from Showa Chemical Industry Co., Ltd.; and the like.

The average particle diameter of the hollow particles used is not particularly limited. For example, it can be selected from a range of 1 μm to 500 μm, preferably 5 μm to 400 μm, more preferably 10 μm to 300 μm, or yet more preferably 10 μm to 200 μm (e.g. 10 μm to 150 μm). The average particle diameter of the hollow particles is usually suitably 50% of the thickness of the viscoelastic layer (B) or smaller, or preferably 30% or smaller (e.g. 10% or smaller).

The specific gravity of the hollow particles is not particularly limited. In view of uniform dispersibility and mechanical strength, etc., for instance, it can be selected from a range of 0.1 g/cm$^3$ to 1.8 g/cm$^3$, preferably 0.1 g/cm$^3$ to 1.5 g/cm$^3$, or more preferably 0.1 g/cm$^3$ to 0.5 g/cm$^3$ (e.g. 0.2 g/cm$^3$ to 0.5 g/cm$^3$).

The amount of the hollow particles used is not particularly limited. For instance, it can be about 1 to 70% by volume of the total viscoelastic layer (B). It is usually suitably about 5 to 50% by volume, or preferably about 10 to 40% by volume. From the standpoint of increasing the peel strength, the hollow particles may preferably be used in an amount of 15% by volume or more (e.g. 20% by volume or more, typically 30% by volume or more) of the total viscoelastic layer (B).

[Bubbles]

The viscoelastic layer (B) may include bubbles. The inclusion of bubbles in the viscoelastic layer (B) can increase the cushioning effect of the PSA sheet, increasing the flexibility. When the PSA sheet is highly flexible, the PSA sheet is more likely to deform to conform to unevenness or steps on an adherend surface, thereby allowing its adhesive face to tightly adhere to the adherend surface. Tighter adhesion of the adhesive face to the adherend surface may advantageously contribute to increase the peel strength to a low polar surface and various other types of surface. Increased flexibility of the PSA sheet may also contribute to reduce the repulsive force of the PSA sheet. By this means, when the PSA sheet is adhered to conform to a curved surface or an adherend surface having steps, or when the adherend to which the PSA sheet has been adhered is deformed, etc., the PSA sheet can be effectively suppressed from peeling off (lifting above) the adherend surface due to its own repulsive force.

The viscoelastic layer (B) may comprise both filler (e.g. hollow particles) and bubbles such as those described above. A PSA sheet comprising such a viscoelastic layer (B) is preferable since it is likely to have well-balanced flexibility and cohesive strength.

The bubbles contained in the viscoelastic layer (B) may be independent bubbles, successive bubbles, or a mixture of these. From the standpoint of the cushioning effect, a viscoelastic layer (B) comprising many independent bubbles is more preferable. Preferably, many of the bubbles comprised in the viscoelastic layer (B) are independent bubbles. With respect to independent bubbles, the gaseous component included in the bubbles (gas component forming the bubbles; or "bubble-forming gas" hereinafter) is not particularly limited, and it can be various gaseous components such as inert gases including nitrogen, carbon dioxide, argon, etc., as well as various gaseous components such as air, etc. When the polymerization, etc., are carried out in a state containing the bubble-forming gas, it is preferable to use, as the bubble-forming gas, a gas species that does not inhibit the polymerization reaction(s). From such a standpoint and in respect of cost, etc., nitrogen can be preferably used as the bubble-forming gas.

In typical, the shapes of bubbles are more or less globular while they are not limited to such shapes. The average diameter of bubbles (average bubble diameter) is not particularly limited. It can be selected, for instance, from a range of 1 µm to 1000 µm, preferably 10 µm to 500 µm, or more preferably 30 µm to 300 µm. The average bubble diameter is usually suitably 50% of the thickness of the viscoelastic layer (B) or smaller, or preferably 30% or smaller (e.g. 10% or smaller).

The average bubble diameter can be determined typically by scanning electron microscopy (SEM), preferably by measuring 10 or more bubbles for their diameters and arithmetically averaging the results. For this, with respect to non-globular bubbles, they are converted to globular bubbles having the same volumes to determine the average bubble diameter.

When the viscoelastic layer (B) have bubbles, the volume ratio of the bubbles contained (bubble content) in the viscoelastic layer (B) is not particularly limited. It can be suitably selected so as to obtain aiming cushioning effect and flexibility. Relative to the viscoelastic layer (B)'s volume (referring to its apparent volume, which can be determined from the thickness and area of the viscoelastic layer (B)), it can be about 3 to 70% by volume, or it is usually suitably about 5 to 50% by volume, or preferably about 8 to 40% by volume. From the standpoint of increasing the peel strength, the volume ratio of bubbles in the viscoelastic layer (B) is preferably less than 30% by volume (e.g. less than 20% by volume, typically 15% by volume or less).

In the art disclosed herein, the method for forming a viscoelastic layer having bubbles (bubble-containing viscoelastic layer) is not particularly limited, and a known method can be suitably employed. For example, can be suitably employed (1) a method such that a viscoelastic layer-forming composition pre-mixed with a bubble-forming gas (preferably a composition that forms a viscoelastic material upon curing by active energy rays such as UV) is cured to form a bubble-containing viscoelastic layer, (2) a method such that a viscoelastic layer-forming composition containing a foaming agent is used and a bubble-containing viscoelastic layer is formed by forming bubbles from the foaming agent, and like method. The foaming agent used is not particularly limited. A suitable one can be selected from known foaming agents. For instance, foaming agents such as thermally expandable microspheres and the like can be preferably used.

In forming a bubble-containing viscoelastic layer by the method (1), the method for preparing the viscoelastic layer-forming composition pre-mixed with a bubble-forming gas is not particularly limited. A known bubble-mixing method can be used. For instance, a known bubble-mixing device can be used in the method. Examples of a bubble-mixing device include a device comprising a stator having fine teeth on a disc having a through-hole at the center, and a rotor opposing the stator and having fine teeth on a disc similarly to the stator. In between the stator teeth and rotor teeth in such a bubble-mixing device, a viscoelastic layer-forming composition prior to bubble mixing (viscoelastic layer-forming composition precursor) is introduced, and while the rotor is allowed to rapidly spin, a gas component for forming bubbles (bubble-forming gas) is introduced into the viscoelastic layer-forming composition precursor through the through-hole. By this, a viscoelastic layer-forming composition can be obtained with bubbles finely dispersed and mixed therein.

A bubble-containing viscoelastic layer can be formed by, for example, applying such a composition mixed with a bubble-forming gas to a prescribed surface and allowing it to cure. As the curing method, a heating method, a method where an active energy ray (e.g. UV) is irradiated, etc., can be preferably employed. By curing a viscoelastic layer-forming composition mixed with a bubble-forming gas by means of heating or irradiating an active energy ray, etc., while in a state where bubbles are stably retained, a bubble-containing viscoelastic layer can be preferably formed.

From the standpoint of the mixing compatibility of a bubble-forming gas or the stability of bubbles, a surfactant may be added to the viscoelastic layer-forming composition. Examples of such a surfactant include ionic surfactants, hydrocarbon-based surfactants, silicone-based surfactants, fluorine-based surfactants and the like. Among these, fluorine-based surfactants are preferable. In particular, a fluorine-based surfactant having an oxyalkylene group (typically an oxyalkylene group having 2 to 3 carbon atoms) along with a fluorinated hydrocarbon group is preferable. Fluorine-based surfactants can be used singly as one species or in combination of two or more species. Examples of preferably usable commercial fluorine-based surfactants include trade name "SURFLON S-393" available from AGC Seimi Chemical Co., Ltd.

The amount of surfactant used is not particularly limited. For instance, it can be about 0.01 part to 3 parts by weight based on non-volatiles relative to 100 parts by weight of the acrylic polymer in the viscoelastic layer (B).

[Other Components]

As far as the effects by the present invention are not significantly impaired, the viscoelastic layer (B) may contain as necessary known additives such as a tackifying component, plasticizer, softening agent, colorants (pigments, dyes, etc.), antioxidant, leveling agent, stabilizing agent and preservative. For example, when a viscoelastic layer (B) is formed by curing the viscoelastic layer-forming composition by photopolymerization, in order to color the viscoelastic layer (B), a pigment (coloring pigment) can be used as a colorant in an amount that does not significantly inhibit the photopolymerization. When black color is desired for the color of a viscoelastic layer (B), for instance, carbon black can be preferably used as the colorant. In view of the degree of coloration and photopolymerizability, etc., the amount of the pigment such as carbon black used is desirably selected from a range up to 0.15 part by weight (e.g. 0.001 part to 0.15 part by weight) relative to 100 parts by weight of the viscoelastic layer (B) of interest, or preferably from a range of 0.01 part to 0.1 part by weight. The viscoelastic layer (B) may be essentially free of a tackifying component (e.g. an acrylic oligomer). Such a composition can be preferably used, for instance, in a non-adhesive viscoelastic layer (B).

[Thickness of Viscoelastic Layer (B)]

The thickness of the viscoelastic layer (B) is not particularly limited. It is suitably about 100 µm or greater. The viscoelastic layer (B) is highly flexible because of its viscoelasticity. Thus, with the PSA layer (A) supported on the viscoelastic layer (B), the surface (adhesive face) of the PSA layer (A) can be preferably tightly adhered to an adherend.

From the standpoint of the flexibility, the viscoelastic layer (B) has a thickness of preferably 200 µm or larger, or 300 µm or larger (e.g. 350 µm or larger). From the standpoint of obtaining higher flexibility, the thickness of the viscoelastic layer (B) can be 500 µm or larger, or even 700 µm or larger. The art disclosed herein can be preferably implemented in an embodiment where the viscoelastic layer (B) has a thickness of 1 mm or larger. The upper limit of the thickness of the viscoelastic layer (B) is not particularly limited. For instance, it can be about 10 mm or below. From the standpoint of the ease of formation or cohesiveness of the viscoelastic layer (B), etc., the viscoelastic layer (B) usually has a thickness of suitably 5 mm or smaller, or preferably 3 mm or smaller (e.g. 2 mm or smaller).

<PSA Layer (A)>

[Base Polymer (a)]

The PSA layer (A) comprises an acrylic polymer (a) as the base polymer. A preferable example of the acrylic polymer (a) is a polymer of a starting monomer mixture that comprises an alkyl (meth)acrylate as the primary monomer and may further comprise a secondary monomer copolymerizable with the primary monomer. As the monomers of the acrylic polymer (a), an alkyl (meth)acrylate as the primary monomer and one, two or more species of secondary monomer can be used among the aforementioned examples of the monomer that can be used in the acrylic polymer (b).

In a preferable embodiment, as the primary monomer, one, two or more species of alkyl (meth)acrylate with a $C_{1-14}$ (e.g. $C_{1-10}$, typically $C_{4-8}$) $R^2$ in the formula (1) are used. In particular, BA and 2EHA are more preferable. From the standpoint of the adhesion and removability, BA is particularly preferable.

The amount of the alkyl (meth)acrylate as the primary monomer is preferably, but not particularly limited to, for instance, 60% by weight or more (e.g. 80% by weight or more, typically 90% by weight or more) of all the monomers forming the acrylic polymer (a). From the standpoint of the cohesion of the PSA layer (A), etc., the amount of the alkyl (meth)acrylate is suitably 100% by weight or less (e.g. 99.5% by weight or less, typically 99% by weight or less).

The copolymerization ratio of the acidic group-containing monomer in the acrylic polymer (a) disclosed herein is 5% by weight or lower. In other words, the acrylic polymer (a) is obtained by polymerizing a starting monomer mixture that is free of an acidic group-containing monomer or comprises up to 5% (by weight) acidic group-containing monomer. This increases the adhesiveness of the PSA layer to low polar adherends. The ratio of the acidic group-containing monomer in the monomers (starting monomer mixture) of the acrylic polymer (a) is preferably 4% by weight or less (e.g. 3% by weight or less). The monomers may be essentially free of an acidic group-containing monomer.

Typical examples of the acidic group-containing monomer include various carboxy group-containing monomers, metal salts (alkali metal salts) thereof, and acid anhydride group-containing monomers. As these acidic group-containing monomers, one, two or more species can be preferably used among the aforementioned examples of the carboxy group-containing monomers, metal salts (e.g. alkali metal salts) thereof and acid anhydride group-containing monomers that can be used in the acrylic polymer (b). In particular, AA and MAA are more preferable.

In a preferable embodiment, the ratio (ACb/ACa) of the copolymerization ratio ACb of the acidic group-containing monomer in the acrylic polymer (b) to the copolymerization ratio ACa of the acidic group-containing monomer in the acrylic polymer (a) is higher than 1. According to this embodiment, while the amount of the acidic group-containing monomer used in the PSA layer (A) is limited to maintain good adhesion to low polar adherends, the cohesion of the viscoelastic layer (B) not forming an adhesive face will increase and, for instance, the shear strength and holding power tend to further increase. The ratio (ACb/ACa) is more preferably 2 or higher (e.g. 2.5 or higher, typically 3 or higher). The maximum ratio (ACb/ACa) is not particularly limited, but it is suitably about 10 or lower (e.g. 5 or lower).

In the synthesis of the acrylic polymer (a), when using the various secondary monomers (including functional group-containing monomers, other secondary monomers besides functional group-containing monomers, and polyfunctional monomers, but excluding acidic group-containing monomers) exemplified earlier regarding the acrylic polymer (b), they can be used in suitably selected amounts so as to allow for Tg adjustment and to obtain desirable cohesive strength; their amounts are not particularly limited. The amount of the functional group-containing monomers excluding acidic group-containing monomers can be, for instance, 0.01% by weight or more (e.g. 0.1% by weight or more, typically 1% by weight or more) of all the monomers forming the acrylic polymer (a). From the standpoint of combining flexibility and cohesive strength in a well-balanced manner, the amount of the functional group-containing monomer is suitably 30% by weight or less (e.g. 25% by weight or less, typically 20% by weight or less) of all the monomers.

While no particular limitations are imposed, as the acrylic polymer (a), a polymer in which a hydroxy group-containing monomer is copolymerized can be preferably used. As the hydroxy group-containing monomer, one, two or more species can be preferably used among the hydroxy group-containing monomers exemplified as a monomer of the acrylic polymer (b). Among them, hydroxyalkyl (meth)acrylates are more preferable, such as 2-hydroxyethyl (meth)acrylate, 2-hydroxypropyl (meth)acrylate, 3-hydroxypropyl (meth)acrylate, 2-hydroxybutyl (meth)acrylate and 4-hydroxybutyl (meth)acrylate.

It is preferable to use the hydroxy group-containing monomer in a range from about 0.001% up to 10% by weight of the total amount of the monomers used in synthesizing the acrylic polymer (a). By this, the PSA layer (A) can be made with balanced high levels of adhesive strength and cohesive strength. When the hydroxy group-containing monomer is used in an amount of about 0.01% or more up to 5% by weight (e.g. 0.05% or more up to 2% by weight), greater results can be obtained.

The acrylic polymer (a) may comprise a vinyl ester (e.g. VAc) as a monomer thereof. In such a case, its amount is suitably, for instance, about 0.1% to 20% (typically 0.5% to 15%) by weight of the total amount of its monomers.

The monomer composition of the acrylic polymer (a) is suitably designed so that the polymer's Tg is −15° C. or lower (typically −70° C. or higher up to −15° C.), preferably −25° C. or lower (e.g. −60° C. or higher up to −25° C.), or more preferably −40° C. or lower (e.g. −60° C. or higher up to −40° C.). From the standpoint of the adhesive properties (e.g. impact resistance, etc.), it is preferable that the Tg of the acrylic polymer (a) is at or below the upper limit values. The Tg of the acrylic polymer (a) is determined by the same method as described for the Tg of the acrylic polymer (b).

The acrylic polymer (a) can be prepared by a known or commonly-used polymerization method. As the polymerization method, a suitable method can be employed among, for instance, thermal polymerization (typically carried out in the presence of a thermal polymerization initiator) such as solution polymerization, emulsion polymerization, bulk polymerization, etc.; active energy ray polymerization carried out by irradiating an active energy ray including lights such as UV, etc., as well as radioactive rays such as β rays, γ rays, etc.; and the like. For instance, solution polymerization can be preferably used. As the method for supplying the monomers in solution polymerization, a suitable method can be employed among an all-at-once supply method in which all the starting monomers are supplied at once, a continuous supply (dripping) method, a portionwise supply (dripping) method, and the like. The polymerization temperature can be suitably selected in accordance with the types of monomers and solvent used, the types of polymerization initiators, etc. For instance, it can be about 20° C. to 170° C. (typically 40° C. to 140° C.).

For the solvent (polymerization solvent) used in solution polymerization, a suitable species can be selected among heretofore known organic solvents. For instance, one species of solvent or a mixture of two or more species of solvent can be used, selected among aromatic compounds (typically aromatic hydrocarbons) such as toluene; aliphatic or alicyclic hydrocarbons such as ethyl acetate; haloalkanes such as 1,2-dichloroethane; lower alcohols (e.g. primary alcohols with 1 to 4 carbon atoms) such as isopropanol; ethers such as tert-butyl methyl ether; ketones such as methyl ethyl ketone; and the like.

The initiator used in the polymerization can be suitably selected among heretofore known polymerization initiators in accordance with the type of polymerization method. For instance, one, two or more species of polymerization initiator can be preferably used among the aforementioned examples of the thermal polymerization initiators that can be used in the polymerization of the acrylic polymer (b). In particular, azo-based initiators such as 2,2'-azobisisobutyronitrile are preferable. The polymerization initiator can be used in a usual amount. For instance, it can be selected from a range of about 0.005 part to 1 part (typically 0.01 part to 1 part) by weight to 100 parts by weight of all the monomers.

The weight average molecular weight (Mw) of the acrylic polymer (a) disclosed herein is not particularly limited. It can be, for instance, in a range of $10 \times 10^4$ or larger up to $500 \times 10^4$. From the standpoint of achieving a balance between cohesive strength and adhesive strength at a high level, the Mw of the acrylic polymer (a) is preferably in a range of $10 \times 10^4$ to $150 \times 10^4$ (e.g. $20 \times 10^4$ to $75 \times 10^4$, typically $35 \times 10^4$ to $65 \times 10^4$). Here, the Mw refers to the value in terms of standard polystyrene obtained by gel permeation chromatography (GPC). As the GPC system, for instance, model name HLC-8320GPC (TSKgel GMH-H(S) column, available from Tosoh Corporation) can be used. The same applies to the working examples described later.

In a preferable embodiment, the acrylic polymer (a) has a dispersity (Mw/Mn) of 3 to 10. With the dispersity being at or above a certain value, there is a certain amount of components with lower molecular weights and the initial peel strength tends to increase. The anchoring to the viscoelastic layer (B) will also increase, leading to a tendency to bring about good removability. When the dispersity is 10 or lower, the heat resistance and removability of the PSA sheet tend to increase. The dispersity is more preferably 4 to 8 (e.g. 5 to 7). The dispersity can be adjusted by the selected polymerization initiator (e.g. selected based on the 10 hour half-life temperature), polymerization conditions, curing conditions, etc. The dispersity can be determined by GPC, employing the same method as for the Mw. The same applies to the working examples described later.

In a preferable embodiment, the ratio of components with molecular weights of $10 \times 10^4$ or smaller in the acrylic polymer (a) is about 10% to 30% by weight. By this, the initial peel strength and the anchoring to the viscoelastic layer (B) tend to increase and the heat resistance and removability of the PSA sheet tend to increase as well. The ratio of components with molecular weights of $10 \times 10^4$ or smaller is more preferably 15% to 30% (e.g. 20% to 30%) by weight. The ratio of components with molecular weights of $10 \times 10^4$ or smaller can be adjusted by the selected polymerization initiator (e.g. selected based on the 10 hour half-life temperature), polymerization conditions, curing conditions, etc. The ratio of components with molecular weights of $10 \times 10^4$ or smaller can be determined by GPC. The same applies to the working examples described later.

[Tackifier]

In a preferable embodiment, the PSA layer (A) comprises a tackifier. The tackifier is not particularly limited. Various tackifier resins can be used, for example, rosin-based tackifier resins, terpene-based tackifier resins, hydrocarbon-based tackifier resins, phenolic tackifier resins, epoxy-based tackifier resins, polyamide-based tackifier resins, elastomer-based tackifier resins, and ketone-based tackifier resins. Among these tackifier resins, solely one species or a combination of two or more species can be used. Among them, rosin-based tackifier resins, terpene-based tackifier resins, hydrocarbon-based tackifier resins and phenolic tackifier resins are preferable. Rosin-based tackifier resins, terpene-based tackifier resins and phenolic tackifier resins are more preferable.

Specific examples of the rosin-based tackifier resin include unmodified rosins (raw rosins) such as gum rosin, wood rosin, tall-oil rosin, etc.; modified rosins (hydrogenated rosins, disproportionated rosins, polymerized rosins, other chemically-modified rosins, etc., and the same applies hereinafter) obtainable from these unmodified rosins via modifications such as hydrogenation, disproportionation, polymerization, etc.; various other rosin derivatives; and the like. Examples of the rosin derivatives include rosin esters such as unmodified rosins esterified with alcohols (i.e., esterification products of unmodified rosins), modified rosins esterified with alcohols (i.e., esterification products of modified rosins), and the like; unsaturated fatty acid-modified rosins such as unmodified rosins and modified rosins modified with unsaturated fatty acids; unsaturated fatty acid-modified rosin esters such as rosin esters modified with unsaturated fatty acids; rosin alcohols from the reductive treatment of a carboxyl group in unmodified rosins, modified rosins, unsaturated fatty acid-modified rosins or unsaturated fatty acid-modified rosin esters; metal salts of rosins (in particular, of rosin esters) such as unmodified rosins, modified rosins, various rosin derivatives, etc.; rosin phenol resins obtainable from the addition of phenol to rosins (unmodified rosin, modified rosin, various rosin derivatives, etc.) by heat polymerization in the presence of an acid catalyst; and so on. When an acrylic polymer is used as the base polymer, it is preferable to use a rosin-based tackifier resin. From the standpoint of increasing the repulsion resistance and the adhesive properties such as adhesive strength, etc., among the rosin-based tackifier resins, a suitable species can be selected for use, or two, or three or more species of varied types, properties (e.g. softening point), etc., can be used in combination.

Examples of the terpene-based tackifier resin include terpene resins such as an α-pinene polymer, β-pinene polymer, dipentene polymer, etc.; modified terpene resins from the modification (e.g., phenol modification, aromatic group modification, hydrogenation, hydrocarbon modification, etc.) of these terpene resins; and the like. Examples of the modified terpene resins include a terpene-phenol resin, styrene-modified terpene resin, aromatic group-modified terpene resin, hydrogenated terpene resin, and the like. When an acrylic polymer is used as the base polymer, it is preferable to use a terpene-based tackifier resin (e.g. a terpene-phenol resin). In particular, from the standpoint of increasing the repulsion resistance and the adhesive properties such as adhesive strength, etc., among the terpene-based tackifier resins (e.g. terpene-phenol resins), a suitable species can be selected for use, or two or more species of varied types and properties (e.g. softening point), etc., can be used in combination.

Examples of the hydrocarbon-based tackifier resin include various hydrocarbon-based resins such as aliphatic hydrocarbon resins, aromatic hydrocarbon resins (e.g. xylene resin, etc.), alicyclic hydrocarbon resins, aliphatic-aromatic petroleum resins (styrene-olefin-based copolymers, etc.), aliphatic-alicyclic petroleum resins, hydrogenated hydrocarbon resins, coumarone-based resins, coumarone-indene-based resins, and the like.

Examples of the phenolic tackifier resin include condensation products of formaldehyde and various phenols such as phenol, m-cresol, 3,5-xylenol, p-alkylphenol and resorcinol, with examples of the condensation products including alkylphenolic resins and xylene-formaldehyde-based resins; resoles obtainable by base-catalyzed addition reactions of the phenols and formaldehyde, and novolacs obtainable by acid-catalyzed condensation reactions of the phenols and formaldehyde. Other examples include rosin-modified phenol resins obtainable by addition of phenol to rosins (unmodified rosin, modified rosins, various rosin derivatives, etc.) followed by thermal polymerization.

In the art disclosed herein, a tackifier resin having a softening point (softening temperature) of about 60° C. or higher (preferably about 80° C. or higher, typically 100° C. or higher) can be preferably used. With the tackifier resin having such a softening point, the PSA sheet can be made to provide higher performance (e.g. greater adhesiveness). The maximum softening point of the tackifier resin is not particularly limited and can be about 180° C. or lower (e.g. about 140° C. or lower). When two or more species of tackifier resin are used, it is preferable that each tackifier resin has such a softening point. The softening point of a tackifier resin here is defined as the value measured by the softening point test method (ring and ball method) specified in either JIS K 5902:2006 or JIS K 2207:2006.

The amount of tackifier used is not particularly limited, and can be selected in accordance with the desired adhesive properties (adhesive strength, etc.). For example, based on non-volatiles, it is preferable to use a tackifier resin in an amount of about 5 parts to 80 parts (more preferably 10 parts to 60 parts, or yet more preferably 20 parts to 50 parts) by weight to 100 parts by weight of the acrylic polymer (a).

[Other Components]

In the PSA composition (A) used to form the PSA layer (A), a crosslinking agent may be used as necessary. The type of crosslinking agent is not particularly limited. A suitable species can be selected and used among heretofore known crosslinking agents. As the crosslinking agent, one, two or more species can be used among the various crosslinking agents exemplified regarding the viscoelastic layer (B). From the standpoint of increasing the cohesive strength, it is preferable to use an isocyanate-based crosslinking agent and/or an epoxy-based crosslinking agent. The amount of the crosslinking agent used is not particularly limited. For instance, it can be selected from a range of about 10 parts or less (e.g. about 0.005 part to 10 parts, preferably about 0.01 part to 5 parts) by weight to 100 parts by weight of the acrylic polymer (a).

The PSA composition (A) may contain as necessary various additives generally used in the field of PSA compositions, such as a leveling agent, crosslinking co-agent, plasticizer, softener, filler, colorant (dye, pigment, etc.), antistatic agent, anti-aging agent, ultraviolet light absorber, antioxidant, and photostabilizer. With respect to these various additives, those heretofore known can be used by typical methods. Since these do not specifically characterize the present invention, detailed descriptions are omitted.

The PSA layer (A) disclosed herein may be formed from an aqueous PSA composition, solvent-based PSA composition, hot-melt PSA composition, or active energy ray-curable PSA composition. The aqueous PSA composition refers to a PSA composition comprising a PSA (PSA layer-forming components) in a solvent primarily comprising water (an aqueous solvent) and typically includes what is called a water-dispersed PSA composition (a composition in which the PSA is at least partially dispersed in water). The solvent-based PSA composition refers to a PSA composition comprising a PSA in an organic solvent. From the standpoint of favorably bringing about adhesive properties, the art disclosed herein is preferably implemented in an embodiment comprising a PSA layer (A) formed from a solvent-based PSA composition.

There are no particular limitations to the method for forming a PSA sheet comprising a PSA layer (A) and a viscoelastic layer (B). For instance, can be preferably employed a method such that a PSA layer (A) is formed on a readily releasable surface (release face, e.g. a surface of a release liner) and the PSA layer (A) is adhered (transferred) to a surface of a viscoelastic layer (B). A PSA composition (A) for forming the PSA layer (A) can be applied to the surface of the viscoelastic layer (B) and allowed to cure (e.g. to dry) to form a PSA layer (A) on the surface of the viscoelastic layer (B). Alternatively, a composition (B) for forming the viscoelastic layer (B) can be applied to the surface of the PSA layer (A) and allowed to cure (e.g. by UV) to form a viscoelastic layer (B) on the PSA layer (A). In order to increase the tightness of adhesion between the PSA layer (A) and the viscoelastic layer (B), before layering the PSA layer (A) and the viscoelastic layer (B), for instance, the PSA layer (A)-side surface of the viscoelastic layer (B) or the viscoelastic layer (B)-side surface of the PSA layer (A) may or may not be subjected to a surface treatment (a treatment to increase the tightness) such as corona discharge treatment.

[Thickness of PSA Layer (A)]

In the art disclosed herein, the thickness of the PSA layer (A) constituting an adhesive face is not particularly limited. For instance, it can be 1 μm or greater. From the standpoint of the peel strength, the PSA layer (A) has a thickness of suitably 5 μm or greater (e.g. 10 μm or greater, typically 20 μm or greater). From the standpoint of the cohesive strength, etc., the thickness is suitably 200 μm or less, or preferably 150 μm or less (e.g. 100 μm or less, typically 80 μm or less). Because of the inclusion of the viscoelastic layer (B), even when the PSA layer (A) is thin, the PSA sheet disclosed herein can effectively conform to unevenness or steps on an adherend surface to stick tightly to the adherend surface. This can provide high peel strength. From such a standpoint, the thickness of the PSA layer (A) can be 60 μm or less (e.g. 40 μm or less).

In a preferable embodiment, the ratio ($T_B/T_A$) of the thickness $T_B$ of the viscoelastic layer (B) to the thickness $T_A$ of the PSA layer (A) is higher than 1. By this, the effects (flexibility; increased peel strength, conformability, etc., based on the flexibility) of the viscoelastic layer (B) may be obtained to a greater extent. With the limited thickness of the PSA layer (A), the removability tends to increase. The ratio ($T_B/T_A$) is more preferably 10 or higher (e.g. 12 or higher, typically 15 or higher); it can be 20 or higher (e.g. 30 or higher, typically 40 or higher). The maximum ratio ($T_B/T_A$) is not particularly limited. It can be about 100 or lower (e.g. 50 or lower).

<Support Substrate>

The PSA sheet disclosed herein may comprise a support substrate, for instance, as the single-faced PSA sheet 3 shown in FIG. 3. As the support substrate, a suitable one can be selected and used in accordance with the intended application of the PSA sheet, for instance, among plastic films such as polypropylene films, ethylene-propylene copolymer films, polyester films, polyvinyl chloride films, etc.; foam sheets made of foam such as polyurethane foam, polyethylene foam, polychloroprene foam, etc.; woven fabrics and non-woven fabrics (meaning to include paper such as Washi, high-grade paper, etc.) of a single species or a blend, etc., of various species of fibrous substances (which can be natural fibers such as hemp, cotton, etc.; synthetic fibers such as polyester, vinylon, etc.; semi-synthetic fibers such as acetate, etc.; and the like); metal foil such as aluminum foil, copper foil, etc.; and the like. The plastic film (typically referring to a non-porous plastic film, which should be conceptually distinguished from a woven fabric and a non-woven fabric) may be a non-stretched film, or a stretched (uni-axially stretched or bi-axially stretched) film.

The thickness of the support substrate can be suitably selected depending on the purpose while it is generally about 2 μm to 500 μm. Usually, a substrate of about 10 μm to 200 μm thickness can be preferably used. When the support substrate is a foam sheet, the upper limit of the support substrate's thickness can be, for instance, about 10 cm while it is usually suitable to be about 5 cm (e.g. about 2 cm).

The surface of the support substrate on the side provided with a PSA layer can be subjected to a surface treatment to increase the non-releasability (anchoring ability) of the surface, with examples including a corona discharge treatment, formation of a primer layer, etc. The other surface of the support substrate opposing the side provided with the PSA layer may be subjected to a suitable treatment, such as a treatment to increase the releasability of the surface (formation of a release layer, laminating with a poorly adhesive material such as a polyolefin film, etc.), a treatment to increase the non-releasability or printability of the surface (corona discharge treatment, etc.) and a treatment to make the surface more decorative (e.g. printing, metal deposition).

<Release Liner>

The PSA sheet disclosed herein may be in an embodiment where its adhesive face(s) are protected with release liner(s) before its use (i.e. before adhered to an adherend). As the release liner, conventional release papers and the like can be used without particular limitations. For example, can be used a release liner having a release layer on a surface of a substrate such as a plastic film or paper, etc.; a release liner formed from a poorly adhesive material such as a fluorine-based polymer (polytetrafluoroethylene, etc.) and poly-olefin-based resin (polyethylene, polypropylene, etc.); and the like. The release layer may be formed, for instance, by subjecting the substrate to a surface treatment by a release agent with examples including a silicone-based, long chain alkyl-based, fluorine-based release agents and molybdenum sulfide.

Alternatively, in a single-faced PSA sheet such as PSA sheet 3 shown in FIG. 3, it may be in a form such that with the surface 36A of support substrate 36 being a release face, by winding PSA sheet 3, the surface 36A of support substrate 36 contacts and protects the adhesive face 3A. As in this, the PSA sheet may be in a form such that the support substrate serves as a release liner as well.

The overall thickness of the PSA sheet including the PSA layer (A) and the viscoelastic layer (B) (excluding the thickness of any release liner) is suitably larger than 100 μm or preferably larger than 200 μm (e.g. larger than 350 μm, typically larger than 500 μm). The art disclosed herein can also be preferably implemented in an embodiment where the overall thickness of the PSA sheet is larger than 1 mm. The maximum overall thickness of the PSA sheet is not particularly limited. For example, it can be about 15 mm or smaller; it is usually suitably about 10 mm or smaller, preferably 7 mm or smaller, or more preferably 5 mm or smaller (e.g. 3 mm or smaller).

<Characteristics of PSA Sheet>

The PSA sheet disclosed herein (specifically, the adhesive face of the PSA layer (A)) preferably exhibits a to-polypropylene 90° peel strength (to-PP 90° peel strength) of 30 N/25 mm or greater. The PSA sheet exhibiting such peel strength can strongly adhere to adherends (particularly to low polar adherends such as PP). The to-PP 90° peel strength is more preferably 32 N/25 mm or greater (e.g. 35 N/25 mm or greater, typically 40 N/25 mm or greater), or yet more preferably 45 N/25 mm or greater (e.g. 50 N/25 mm or greater). The to-PP 90° peel strength is measured by the method described later in the working examples.

The PSA sheet disclosed herein preferably exhibits a 90° peel strength to an acrylonitrile-butadiene-styrene copolymer (ABS) plate (to-ABS 90° peel strength) of 40 N/25 mm or greater. The PSA sheet exhibiting such peel strength can strongly adhere to various adherends (e.g. resin adherends such as ABS). The to-ABS 90° peel strength is more preferably 42 N/25 mm or greater (e.g. 45 N/25 mm or greater, typically 50 N/25 mm or greater), or yet more preferably 55 N/25 mm or greater (e.g. 60 N/25 mm or greater). The to-ABS 90° peel strength is measured by the method described later in the working examples.

In a preferable embodiment of the PSA sheet disclosed herein, the interlayer peel strength between the PSA layer (A) and the viscoelastic layer (B) is 30 N/25 mm or greater. With the interlayer peel strength being at or above a certain value, for instance, when removing the PSA sheet strongly bonded to an adherend, the occurrence of anchoring failure is reduced or prevented, achieving excellent removability. The interlayer peel strength is more preferably 40 N/25 mm or greater (e.g. 50 N/25 mm or greater, typically 60 N/25 mm or greater). As for the interlayer peel strength, the value described next is used: when the peel strength is measured by carrying out as for the to-PP 90° peel strength or the to-ABS 90° peel strength described later in the working examples, if the peel results in interfacial failure (a form of failure associated with peeling at the interface between the adhesive face of the PSA layer (A) and the adherend), the interlayer peel strength can be considered at least equal to or greater than the measured peel strength; and therefore, the measured peel strength (to-PP or to-ABS 90° peel strength) can be used as the interlayer peel strength (90° interlayer peel strength) in N/25 mm.

\<Applications\>

The PSA sheet disclosed herein can be preferably used in an embodiment where the adhesive face consisting of the PSA layer (A) is adhered to various types of adherend. Examples of preferable adherends for the PSA sheet disclosed herein include, but not limited to, adherends made of resin including polyolefin resin such as a polyethylene resin and polypropylene resin; ABS resin; high impact polystyrene (HIPS) resin, polycarbonate (PC) resin and a polymer blend of PC and ABS (PC/ABS resin).

The PSA sheet disclosed herein is highly flexible (easily deformable) because of the inclusion of the viscoelastic layer (B). Therefore, when joining these materials, it can conform to unevenness or steps present on surfaces of the materials by means of deformation of the PSA so as to produce a quality joint between two materials. Thus, the PSA sheet is useful for instance, for joining components in various types of OA equipment, house appliances, automobiles, and so on (e.g. for fastening various types of components in such products).

Several working examples relating to the present invention are described below, but the present invention is not intended to be limited to these examples. In the description below, "parts" and "%" are by weight unless otherwise specified.

(Preparation of PSA Layer (A1))

To a reaction vessel equipped with a stirrer, thermometer, nitrogen inlet, reflux condenser and addition funnel, were placed 100 parts of n-butyl acrylate (BA), 8 parts of vinyl acetate (VAc), 3 parts of acrylic acid (AA), 0.1 part of 2-hydroxyethyl acrylate (HEA), 0.2 part of 2,2'-azobisisobutyronitrile (AIBN) as the polymerization initiator and a 5/5 (by weight) mixture of toluene and ethyl acetate as the polymerization solvent. The reaction vessel was purged with nitrogen at room temperature for one hour and then solution polymerization was carried out around 58° C. for six hours. Subsequently, the reaction mixture was kept at 65° C. for two hours and at 72° C. for two hours. It was then allowed to cool to obtain a solution of an acrylic polymer (a1). The acrylic polymer (a1) had a Mw of about $60 \times \times 10^4$. Mw/Mn was 5.0 and the ratio of polymers with a fraction having a molecular weight up to $10 \times 10^4$ accounts for about 20% by weight.

To the resulting acrylic polymer (a1) solution, to 100 parts of the acrylic polymer (a1), were added 10 parts of a rosin phenol resin (trade name TAMANOL 803 available from Arakawa Chemical Industries, Ltd.), 10 parts of a hydrogenated rosin glycerin ester (trade name ESTER GUM H available from Arakawa Chemical Industries, Ltd.) and 15 parts of a polymerized rosin pentaerythritol ester (trade name PENSEL D125 available from Arakawa Chemical Industries, Ltd.) as tackifier resins and 2 parts of an isocyanate-based crosslinking agent (trade name CORONATE L available from Nippon Polyurethane Industry Co., Ltd.) as a crosslinking agent to prepare a PSA composition (A1).

A sheet of release liner was obtained, made of high grade paper laminated with a 25 µm thick PE layer treated with a silicone-based release agent. To the release face of the release liner, the PSA composition (A1) was applied and allowed to dry at 120° C. for 3 minutes to form a PSA layer (A1). Two PSA layers (A1) with different thicknesses (25 µm and 50 µm) were obtained.

(Preparation of PSA Layer (A2))

To a reaction vessel equipped with a stirrer, thermometer, nitrogen inlet, reflux condenser and addition funnel, were placed 95 parts of BA, 5 parts of AA and toluene as the polymerization solvent. After purged with nitrogen at room temperature for one hour, the reaction mixture was heated to 60° C. To this, was added 0.2 part of AIBN as the polymerization initiator. Polymerization was carried out around 63° C. for seven hours to obtain a solution of an acrylic polymer (a2). The acrylic polymer (a2) had a Mw of about $50 \times 10^4$.

To the resulting acrylic polymer (a2) solution, to 100 parts of the acrylic polymer (a2), were added 20 parts of a rosin phenol resin (trade name TAMANOL 803 available from Arakawa Chemical Industries, Ltd.) and 30 parts of a hydroxyl group-containing xylene-formaldehyde-based tackifier resin (trade name NIKANOL H-80 available from Mitsubishi Gas Chemical, Inc.) as tackifier resins; were further added 0.05 part of a nitrogen atom-containing hydroxy compound (trade name EDP-300 available from Adeka Corporation) as a hydroxy compound and 4 parts of an isocyanate-based crosslinking agent (trade name CORONATE L available from Nippon Polyurethane Industry Co., Ltd.) as a crosslinking agent to prepare a PSA composition (A2).

A sheet of release liner was obtained, made of high grade paper laminated with a 25 µm thick PE layer treated with a silicone-based release agent. To the release face of the release liner, the PSA composition (A2) was applied and allowed to dry at 110° C. for 3 minutes to form a 25 µm thick PSA layer (A2).

(Preparation of PSA Layer (A3))

Into a four-neck flask, was placed a monomer mixture formed of 94 parts of 2-ethylhexyl acrylate (2EHA) and 6 parts of AA along with 0.05 part of 2,2-dimethoxy-1,2-diphenylethane-1-on (trade name IRGACURE 651 available from BASF Corporation) and 0.05 part of 1-hydroxycyclohexyl phenyl ketone (trade name IRGACURE 184 available from BASF Corporation). The mixture was irradiated with UV under a nitrogen atmosphere and partially photo-polymerized to obtain syrup comprising a partial polymerization product.

An acrylic oligomer was also prepared. In particular, to 60 parts of cyclohexyl methacrylate and 40 parts of isobutyl methacrylate, were added 4 parts of thioglycolic acid as a chain transfer agent and toluene as the solvent. Nitrogen gas was bubbled into the mixture to remove dissolved oxygen. Subsequently, the mixture was heated to 90° C. To this, were added 0.005 part of trade name PERHEXYL O (NOF Corporation) and 0.01 part of trade name PERHEXYL D (NOF Corporation) as polymerization initiators. The mixture was stirred at 90° C. for one hour, heated to 150° C. gradually over one hour, and stirred at 150° C. for 60 minutes. The mixture was then heated to 170° C. gradually over one hour and stirred at 170° C. for 60 minutes. Subsequently, at 170° C., the mixture was stirred under reduced pressure for one hour to remove remaining monomers to obtain an acrylic oligomer with a Mw of 3700.

To 100 parts of the syrup obtained earlier, were admixed 0.08 part of 2-isocyanatoethyl acrylate and 20 parts of the acrylic oligomer to prepare a PSA composition (A3).

Two sheets of 38 µm thick PET film were obtained, each having one release face treated with a silicone-based release agent. To the release face of the first sheet of PET film, the PSA composition (A3) was applied with a roll coater. Subsequently, the second sheet of PET film was adhered to cover the outer surface of the applied composition (A3) with the release face. Both faces were then subjected to UV irradiation using black light lamps at 5 mW/cm$^2$ in intensity for three minutes to form a 70 µm thick PSA layer (A3).

(Preparation of Viscoelastic Layer (B1))

To a monomer mixture formed of 85 parts of 2EHA and 15 parts of AA, were added 0.05 part of 2,2-dimethoxy-1,2-diphenylethane-1-one (trade name IRGACURE 651 available from BASF Corporation) and 0.05 part of 1-hydroxy-cyclohexyl phenyl ketone (trade name IRGACURE 184 available from BASF Corporation) as photopolymerization initiators. Subsequently, the mixture was irradiated with UV to a viscosity of about 15 Pa·s to prepare monomer syrup (b1) (partial polymerization product) in which the monomer mixture had been partially polymerized. The viscosity was measured using a BH viscometer with a No. 5 rotor at a rotational speed of 10 rpm at a measurement temperature of 30° C.

To 100 parts of the monomer syrup (b1), were added 0.15 part of dipentaerythritol hexaacrylate (DPHA) and 15 parts of hollow glass balloons (40 μm average particle diameter, trade name FUJI BALLOON H-40 available from Fuji Silysia Chemical Ltd.) to obtain a viscoelastic layer-forming composition (B1).

Two sheets of 38 μm thick PET film were obtained, each having one release face treated with a silicone-based release agent. To 100 parts of the viscoelastic layer-forming composition (B1), was added 0.03 part of IRGACURE 651. The resulting mixture was applied to the release face of the first sheet of PET film and covered with the release face of the second sheet of PET film. Both faces were subjected to UV irradiation at 5 mW/cm² in intensity for 3 minutes to cure the applied composition. For the UV irradiation, trade name BLACK LIGHT available from Toshiba Corporation was used. UV measurement was conducted with an industrial UV checker (trade name UVR-T 1 available from Topcon Technohouse Corporation) of about 350 nm peak sensitivity wavelength. A 800 μm thick viscoelastic layer (B1) was thus formed.

(Preparation of Viscoelastic Layer (B2))

Using a monomer mixture formed of 90 parts of 2EHA and 10 parts of AA, but otherwise in the same manner as for the monomer syrup (b1), monomer syrup (b2) was prepared.

To 100 parts of the monomer syrup (b2), were added 0.15 part of DPHA as a crosslinking agent and 12.5 parts of hollow glass balloons (trade name FUJI BALLOON H-40, 40 μm average particle diameter, available from Fuji Silysia Chemical Ltd.) to obtain a viscoelastic layer-forming composition (B2). Using the viscoelastic layer-forming composition (B2), but otherwise in the same manner as for the viscoelastic layer (B1), viscoelastic layers (B2) were prepared. Three viscoelastic layers (B2) with different thicknesses (400 μm, 800 μm and 1200 μm) were obtained.

(Preparation of Viscoelastic Layer (B3))

To 100 parts of the monomer syrup (b2), were added 0.08 part of 1,6-hexanediol diacrylate (HDDA) as a crosslinking agent and 12.5 parts of hollow glass balloons (trade name FUJI BALLOON H-40, 40 μm average particle diameter, available from Fuji Silysia Chemical Ltd.). The resultant was subjected to a bubble-removing treatment. After the treatment, was added 0.7 part of a fluorosurfactant to obtain a precursor of a viscoelastic layer-forming composition. Using a bubble-mixing device, the precursor was allowed to stir with nitrogen introduced through the through-hole in the device to obtain a viscoelastic layer-forming composition (B3) with bubbles dispersed and mixed therein. Using the viscoelastic layer-forming composition (B3), but otherwise in the same manner as for the viscoelastic layer (B1), a viscoelastic layer (B3) was prepared. The ratio of bubbles in the viscoelastic layer (B3) was about 10% by volume.

(Preparation of Viscoelastic Layer (B4))

The composition was mixed in a manner to yield a different ratio of bubbles. Otherwise in the same manner as for the viscoelastic layer-forming composition (B3), a viscoelastic layer-forming composition (B4) was prepared. Using the viscoelastic layer-forming composition (B4), but otherwise in the same manner as for the viscoelastic layer (B1), a viscoelastic layer (B4) was prepared. The ratio of bubbles in the viscoelastic layer (B4) was about 20% by volume.

(Preparation of Viscoelastic Layer (B5))

To 100 parts of the monomer syrup (b2), was added 0.08 part of HDDA as a crosslinking agent. Was then added 0.5 part of hollow glass balloons (trade name CEL-STAR Z-27 available from Tokai Kogyo Co. Ltd.). Subsequently, was added 0.5 part of a fluorosurfactant to obtain a precursor of a viscoelastic layer-forming composition. The hollow glass balloons accounted for about 1.5% by volume of the viscoelastic layer-forming composition precursor.

The resulting viscoelastic layer-forming composition precursor was allowed to stir with nitrogen introduced through the through-hole in the device to obtain a viscoelastic layer-forming composition (B5) with bubbles dispersed and mixed therein. In the viscoelastic layer-forming composition (B5), bubbles were mixed in so that it accounted for about 20% by volume of the total volume of the composition (B5).

Two sheets of 38 μm thick PET film were obtained, each having one release face treated with a silicone-based release agent. To the release face of the first sheet of PET film, the viscoelastic layer-forming composition (B5) was applied with a roll coater. Subsequently, the second sheet of PET film was adhered to cover the outer surface of the applied composition (B5) with the release face. Both faces were then subjected to UV irradiation using black light lamps at 5 mW/cm² in intensity for three minutes to form a 730 μm thick viscoelastic layer (B5).

Example 1

The PET film covering one face of the viscoelastic layer (B1) was removed and to the exposed face, a PSA layer (A1) was adhered with a laminator (200 mm/min, 0.2 MPa). A PSA sheet according to Example 1 was thus obtained, formed of 800 μm thick viscoelastic layer (B1) and a 25 μm thick PSA layer (A1) supported on the one face thereof.

Examples 2 to 10

The kinds of PSA layer (A) and their thicknesses as well as the kinds of PSA layer (B) and their thicknesses were changed as shown in Table 1. Otherwise in the same manner as in Example 1, PSA sheets according to Examples 2 to 10 were obtained.

Examples 11 and 12

As for the PSA sheets according to Examples 11 and 12, 25 μm thick PSA layer (A1) and PSA layer (A2) were used as they were.

Examples 13 to 18

As for the PSA sheets according to these examples, the viscoelastic layers (B1) to (B4) having the thicknesses shown in Table 1 were used as they were.

[Measurement of to-ABS 90° Peel Strength]

130 μm thick anodized aluminum foil was adhered to one face of the PSA sheet according to each example to back the sheet. The backed PSA sheet was cut to prepare a 25 mm wide by 70 mm long test piece. The aluminum foil was adhered to the surfaces of the viscoelastic layers for Examples 1 to 10 and 13 to 18 and to the surfaces of the PSA layers for Examples 11 and 12.

The surface of a polypropylene plate (PP plate) as an adherend was cleaned with IPA. To the PP plate, the adhesive face of each test piece was press-bonded with a 5 kg roller moved back and forth twice. After press-bonded, the test pieces were aged under an atmosphere at 23° C. and 50% RH for 20 minutes. To the adherend, were adhered the surfaces (adhesive faces) of the PSA layers with respect to Examples 1 to 12 and the surfaces of the viscoelastic layers were adhered with respect to Examples 13 to 18. After aged, using a tensile tester (model name TENSILON available from Shimadzu Corporation), under an atmosphere at 23° C., 50% RH, while the test piece was peeled from the adherend (PP plate) at a tensile speed of 300 mm/min at a peel angle of 90°, the peel strength (N/25 mm) was measured. The results are shown in Table 1.

[Table 1]

TABLE 1

| | PSA layer (A) | | | Viscoelastic layer (B) | | | 90° Peel strength (N/25 mm) | |
|---|---|---|---|---|---|---|---|---|
| | Type | Acidic group-containing monomer (%) | Thickness (μm) | Type | Acidic group-containing monomer (%) | Thickness (μm) | ABS | PP |
| Ex. 1  | A1 | 2.7 | 25 | B1 | 15 | 800  | 57.5 | 49.8 |
| Ex. 2  |    |     |    | B2 | 10 | 400  | 46.4 | 36.5 |
| Ex. 3  |    |     |    |    |    | 800  | 56.0 | 47.9 |
| Ex. 4  |    |     |    |    |    | 1200 | 65.5 | 53.3 |
| Ex. 5  |    |     |    | B3 | 10 | 800  | 52.1 | 44.5 |
| Ex. 6  |    |     |    | B4 | 10 | 800  | 43.8 | 32.9 |
| Ex. 7  |    |     | 50 | B2 | 10 | 800  | 65.8 | 53.8 |
| Ex. 8  | A2 | 5.0 | 25 |    |    |      | 52.3 | 42.9 |
| Ex. 9  |    |     |    | B4 | 10 | 800  | 67.3 | 35.3 |
| Ex. 10 | A3 | 6.0 | 70 | B5 | 10 | 730  | 43.0 | 15.0 |
| Ex. 11 | A1 | 2.7 | 25 |    | —  |      | 36.6 | 29.4 |
| Ex. 12 | A2 | 5.0 | 25 |    | —  |      | 35.4 | —    |
| Ex. 13 |    | —   |    | B1 | 15 | 800  | 29.9 | 6.5  |
| Ex. 14 |    | —   |    | B2 | 10 | 400  | 36.3 | 10.5 |
| Ex. 15 |    | —   |    |    |    | 800  | 38.2 | 14.8 |
| Ex. 16 |    | —   |    |    |    | 1200 | 41.0 | 9.7  |
| Ex. 17 |    | —   |    | B3 | 10 | 800  | 35.8 | 10.0 |
| Ex. 18 |    | —   |    | B4 | 10 | 800  | 32.4 | 13.2 |

The surface of an acrylonitrile-butadiene-styrene copolymer plate (ABS plate) as an adherend was cleaned with isopropanol (IPA). To the ABS plate, the adhesive face of each test piece was press-bonded with a 5 kg roller moved back and forth twice. After press-bonded, the test pieces were aged under an atmosphere at 23° C. and 50% RH for 20 minutes. To the adherend, were adhered the surfaces (adhesive faces) of the PSA layers with respect to Examples 1 to 12 and the surfaces of the viscoelastic layers were adhered with respect to Examples 13 to 18. After aged, using a tensile tester (model name TENSILON available from Shimadzu Corporation), under an atmosphere at 23° C. and 50% RH, while the test piece was peeled from the adherend (ABS plate) at a tensile speed of 300 mm/min at a peel angle of 90°, the peel strength (N/25 mm) was measured. The results are shown in Table 1.

[Measurement of to-PP 90° Peel Strength]

130 μm thick anodized aluminum foil was adhered to one face of the PSA sheet according to each example to back the sheet. The backed PSA sheet was cut to prepare a 25 mm wide by 70 mm long test piece. The aluminum foil was adhered to the surfaces of the viscoelastic layers for Examples 1 to 10 and 13 to 18 and to the surfaces of the PSA layers for Examples 11 and 12.

As shown in Table 1, the 90° peel strength to the PP plate was as high as or higher than 30 N/25 mm for the PSA sheets according to Examples 1 to 9, each having a viscoelastic layer (B) and a PSA layer (A) with a copolymerization ratio of acidic group-containing monomer in the acrylic polymer (a) at or below a certain value. In particular, with respect to the PSA sheets having the PSA layer (A1) and one of the viscoelastic layers (B1) to (B4), the to-PP 90° peel strength increased by at least about 1.1 times (about 1.1 to 1.8 times) as compared to Example 11 having only the PSA layer (A1). A similar trend is expected when Examples 8 and 9 are compared with Example 12. A low to-PP 90° peel strength value was obtained with respect to the PSA sheet according to Example 10 with more than 5% by weight acidic group-containing monomer copolymerized in the acrylic polymer (a) of the PSA layer (A). Low to-PP 90° peel strength values were also observed when the viscoelastic layers (B) were tested alone (Examples 13 to 18). These results suggest that the surface of the viscoelastic layer (B) is less smooth than the surface of the PSA layer (A). With respect to Examples 1 to 9, in the 90° peel strength tests, the peel resulted in interfacial failure (the peel occurred at the interface between the adhesive face of the PSA layer (A) and the adherend) for all. These results indicate that when a PSA layer (A) is combined with a viscoelastic layer (B) and the amount of the acidic group-containing monomer used in the PSA layer (A) is kept low, a PSA sheet is obtained with high peel strength to low polar adherends. The PSA sheet is highly flexible because of the inclusion of the viscoelastic layer (B).

Although specific embodiments of the present invention have been described in detail above, these are merely for illustrations and do not limit the scope of the claims. The art according to the claims includes various modifications and changes made to the specific embodiments illustrated above.

REFERENCE SIGNS LIST 1, 2, 3 PSA sheets
12, 22, 23, 32 PSA layers (A)
14, 24, 34 viscoelastic layers (B)
36 support substrate

The invention claimed is:

1. A pressure-sensitive adhesive sheet comprising:
a pressure-sensitive adhesive layer (A) constituting an adhesive face, and
a viscoelastic layer (B) supporting the pressure-sensitive adhesive layer (A);
wherein
the viscoelastic layer (B) comprises hollow particles or have bubbles,
the viscoelastic layer (B) further comprises, as its base polymer, an acrylic polymer (b) obtained by polymerizing a starting monomer mixture that comprises an acidic group-containing monomer,
the pressure-sensitive adhesive layer (A) comprises an acrylic polymer (a) as its base polymer,
a glass transition temperature of the acrylic polymer (a) is −60° C. to −25° C.,
an acidic group-containing monomer is copolymerized in the acrylic polymer (a) at a ratio of 5% by weight or lower,
the acrylic polymer (a) has a dispersity (Mw/Mn) of 3 to 10, and
wherein a weight ratio (ACb/ACa) of the acidic group-containing monomer in the acrylic polymer (b) to the acidic group-containing monomer in the acrylic polymer (a) is 2 or higher and 10 or lower wherein the adhesive face exhibits a 90° peel strength to polypropylene of 30 N/25 mm.

2. The pressure-sensitive adhesive sheet according to claim 1 wherein the pressure-sensitive adhesive layer (A) comprises at least one species of tackifier selected from the group consisting of a rosin-based tackifier resin, a terpene-based tackifier resin and a phenolic tackifier resin.

3. The pressure-sensitive adhesive sheet according to claim 2 wherein the pressure-sensitive adhesive layer (A) comprises 10 parts to 50 parts by weight of the tackifier to 100 parts by weight of the base polymer.

4. The pressure-sensitive adhesive sheet according to claim 1 wherein the ratio ($T_B/T_A$) of the thickness $T_B$ of the viscoelastic layer (B) to the thickness $T_A$ of the pressure-sensitive adhesive layer (A) is 12 or higher.

5. The pressure-sensitive adhesive sheet according to claim 1, wherein the viscoelastic layer (B) comprises the hollow particles, and the hollow particles have a diameter of 40 μm or higher.

6. The pressure-sensitive adhesive sheet according to claim 1, wherein the acrylic polymer (a) further comprises a functional group-containing monomer selected from the group consisting of a hydroxyl group-containing monomer, an amide group-containing monomer, a cyano group-containing monomer, a sulfonic acid group-containing monomer, a phosphoric acid group-containing monomer, an oxazoline group-containing monomer, an aziridine group-containing monomer, an amino group-containing monomer, an epoxy group-containing monomer, a keto group-containing monomer, an isocyanate group-containing monomer, and an alkoxysilyl group-containing monomer.

7. The pressure-sensitive adhesive sheet according to claim 1, wherein the acrylic polymer (a) is obtained by polymerizing a starting monomer mixture that consists essentially of an alkyl (meth)acrylate, the acidic group-containing monomer, and optionally at least one hydroxyl group-containing monomer and vinyl ester monomer.

8. The pressure-sensitive adhesive sheet according to claim 1, wherein the acrylic polymer (a) comprises 90% by weight or more of an alkyl (meth)acrylate monomer based on all the monomers forming the acrylic polymer (a).

9. The pressure-sensitive adhesive sheet according to claim 1 wherein the acrylic polymer (a) has the dispersity (Mw/Mn) of 4 to 10.

* * * * *